(12) United States Patent
Cao

(10) Patent No.: US 6,760,158 B1
(45) Date of Patent: Jul. 6, 2004

(54) MULTI-FUNCTIONAL OPTICAL DEVICE UTILIZING MULTIPLE POLARIZATION BEAM SPLITTERS AND NON-LINEAR INTERFEROMETERS

(75) Inventor: Simon X. F. Cao, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 460 days.

(21) Appl. No.: 09/630,891

(22) Filed: Aug. 2, 2000

(51) Int. Cl.⁷ .................................................. G02B 5/30
(52) U.S. Cl. .................... 359/497; 359/122; 359/124; 359/341; 359/484
(58) Field of Search ............................. 359/497, 484, 359/122, 124, 341

(56) References Cited

U.S. PATENT DOCUMENTS

| | | |
|---|---|---|
| 6,130,971 A | 10/2000 | Cao |
| 6,215,926 B1 | 4/2001 | Cao |
| 6,263,126 B1 | 7/2001 | Cao |
| 6,263,129 B1 | 7/2001 | Cao |
| 6,307,677 B2 | 10/2001 | Cao |
| 6,310,690 B1 | 10/2001 | Cao et al. |
| 6,396,629 B1 | 5/2002 | Cao |

OTHER PUBLICATIONS

U.S. patent application Ser. No. 09/894,057, Cao, filed Jun. 28, 2001.
U.S. patent application Ser. No. 09/894,069, Cao, filed Jun. 28, 2001.

Primary Examiner—Audrey Chang
Assistant Examiner—Craig Curtis
(74) Attorney, Agent, or Firm—Sawyer Law Group LLP

(57) ABSTRACT

The present invention provides a multi-functional separator which may be used as a demultiplexer or as a multiplexer in wavelength division multiplexed optical communication systems. The preferred embodiment of the multi-functional separator includes a first polarization beam splitter, a non-reciprocal rotator; a reciprocal rotator, a second polarization beam splitter, and a non-linear interferometer. Each of the polarizing input and polarizing output ports includes an optical fiber, a collimator, a birefringent walk-off plate and a non-reciprocal optical rotator. The multi-functional separator is easily aligned by adjusting the positions of each of the polarizing input and output port. Further embodiments of the present invention provide additional optical isolation, optical circulation, optical comb filtering and/or two-stage channel separation capabilities.

19 Claims, 31 Drawing Sheets

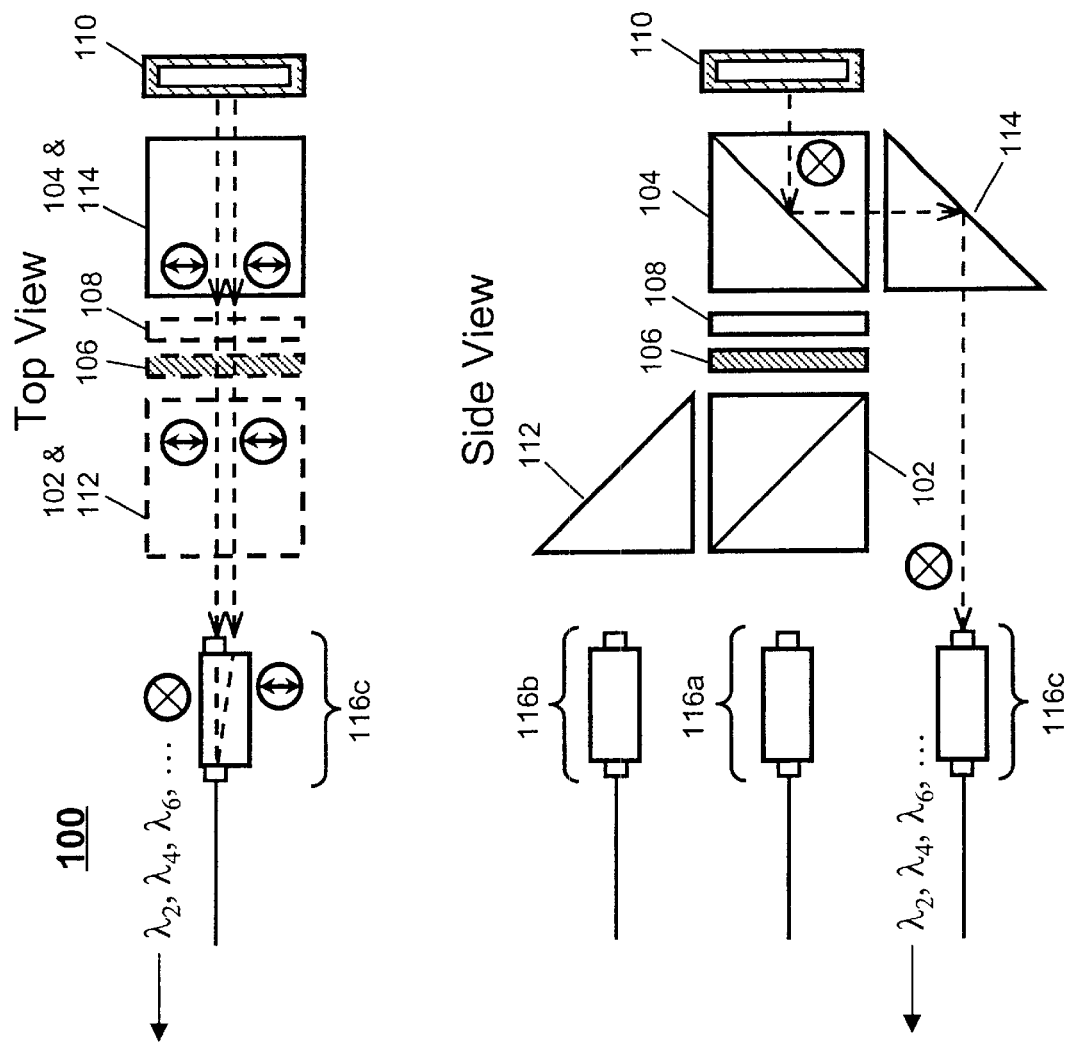

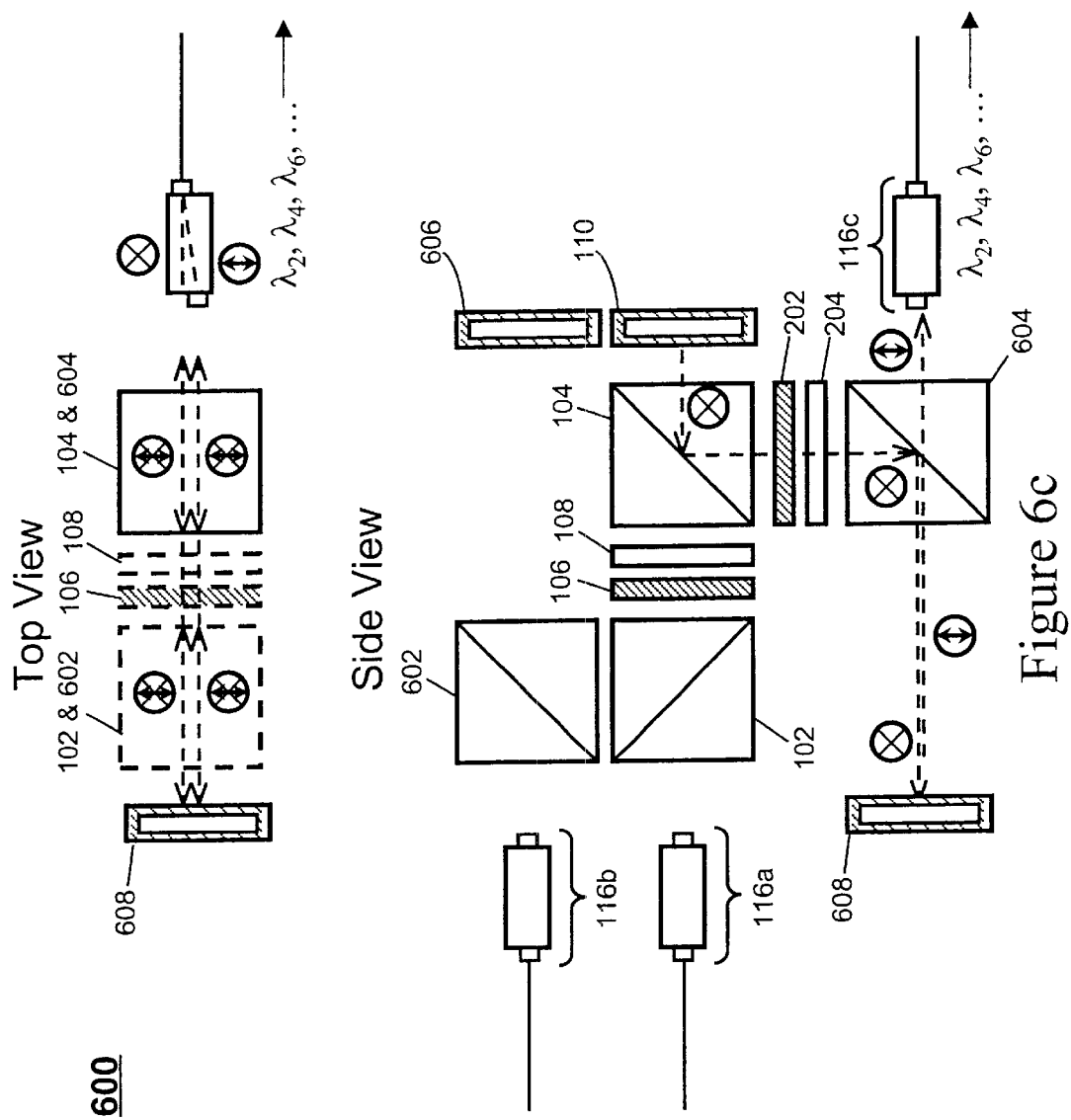

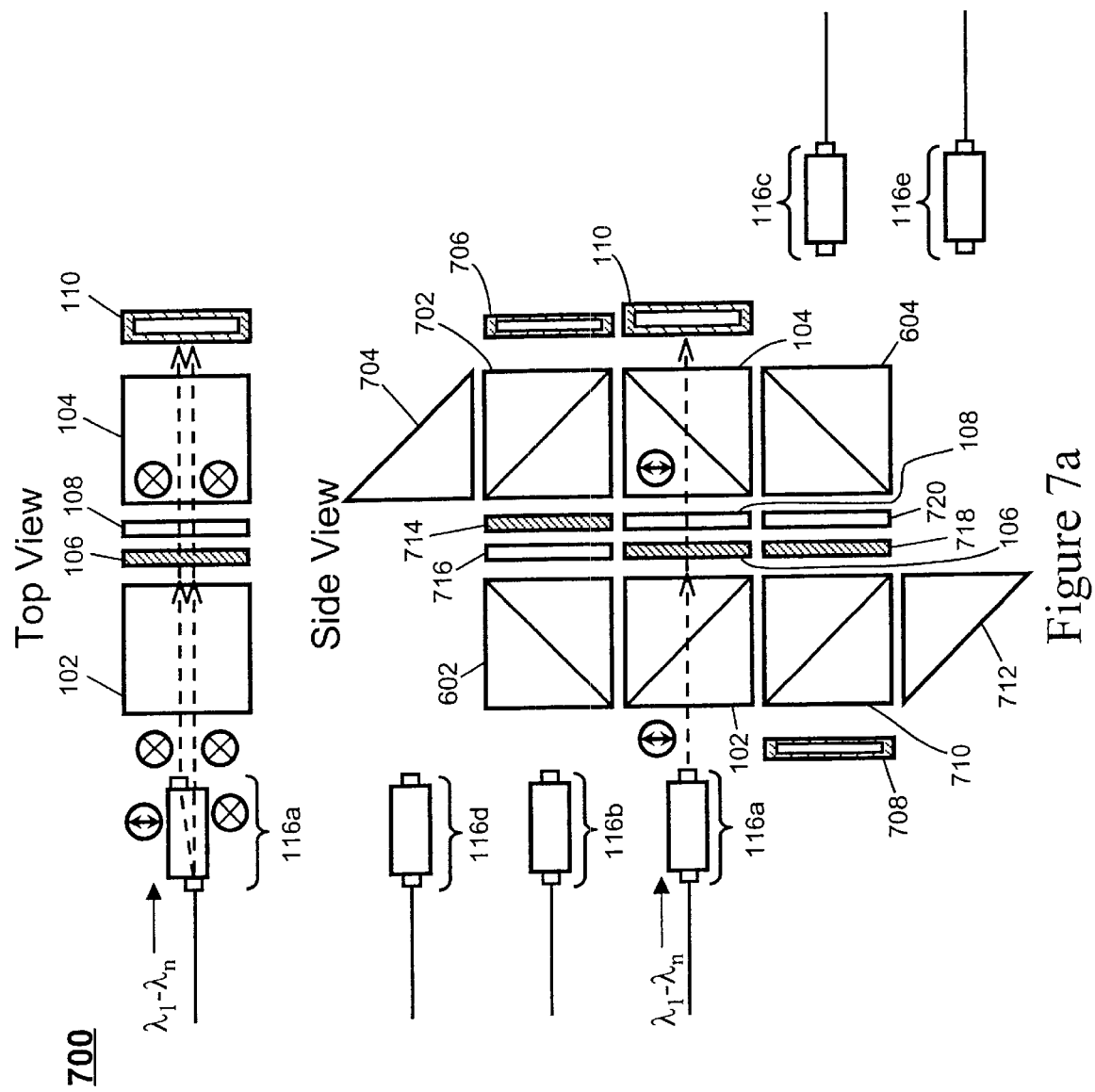

MULTI-FUNCTIONAL OPTICAL DEVICE UTILIZING MULTIPLE POLARIZATION BEAM SPLITTERS AND NON-LINEAR INTERFEROMETERS

FIELD OF THE INVENTION

The present invention relates to fiber optic networks, and more particularly to wavelength division multiplexers, wavelength division de-multiplexers, optical isolators and optical circulators utilized in fiber optic networks carrying wavelength division multiplexed information signals.

BACKGROUND OF THE INVENTION

Fiber optic communication systems are becoming increasingly popular for data transmission due to their high speed and high data capacity capabilities. Wavelength division multiplexing is used in such fiber optic communication systems to transfer a relatively large amount of data at a high speed. In wavelength division multiplexing, multiple information-carrying signals, each signal comprising light of a specific restricted wavelength range, may be transmitted along the same optical fiber.

In this specification, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

The term "wavelength," denoted by the Greek letter $\lambda$ (lambda) is used herein in two senses. In the first usage, this term is used according to its common meaning to refer to the actual physical length comprising one full period of electromagnetic oscillation of a light ray or light beam. In its second usage, the term "wavelength" is used synonymously with the terms "signal" or "channel." Although each information-carrying channel actually comprises light of a certain range of physical wavelengths, for simplicity, a single channel is referred to as a single wavelength, $\lambda$, and a plurality of n such channels are referred to as "n wavelengths" denoted $\lambda_1-\lambda_n$. Used in this sense, the term "wavelength" may be understood to refer to "the channel nominally comprised of light of a range of physical wavelengths centered at the particular wavelength, $\lambda$."

A crucial feature of fiber optic networks is the separation of the composite optical signal into its component wavelengths or channels, typically by a wavelength division de-multiplexer. This separation must occur to allow for the exchange of signals between loops within optical communications networks. The exchange typically occurs at connector points, or points where two or more loops intersect for the purpose of exchanging wavelengths. Conventional methods utilized by wavelength division de-multiplexers in separating a composite optical signal into its component channels include the use of filters and fiber gratings as separators. A "separator" or "channel separator", as used in this specification, is an integrated collection of optical components functioning as a unit which separates one or more channels of a composite optical signal from one another, or else combines separate channels from separate inputs into a single composite optical signal.

A problem with the conventional separators is the precision required of a transmitter device—that is, a light emitting device which generates an optical signal at a particular wavelength—because of the narrow pass bands of such separators. This high precision is difficult to accomplish. Further, signal transmitting devices must be aligned individually for each separator, which is time intensive. Still further, additional, separate optical isolator and circulator components must supplement the separators within the optical communications system, which is wasteful of space and resources. Also, there does not exist any single apparatus that combines the functionality of a channel separator with that of an isolator, a circulator, or a comb filter.

Accordingly, there exists a need for a multi-functional separator which is easily aligned. The multi-functional separator should be able to incorporate additional isolator, circulator and comb-filter functionalities. The present invention addresses such a need.

SUMMARY OF THE INVENTION

The present invention provides a multi-functional separator which may be used as a demultiplexer or as a multiplexer in wavelength division multiplexed optical communication systems. The preferred embodiment of the multi-functional separator includes a first polarization beam splitter, a non-reciprocal rotator; a reciprocal rotator, a second polarization beam splitter, and a non-linear interferometer. Each of the polarizing input and polarizing output ports includes an optical fiber, a collimator, a birefringent walk-off plate and a non-reciprocal optical rotator. The multi-functional separator is easily aligned by adjusting the positions of each polarizing input and output port. Further embodiments of the present invention provide additional optical isolation, optical circulation, optical comb filtering and/or two-stage channel separation capabilities.

BRIEF DESCRIPTION OF THE FIGURES

FIGS. 1a–1c illustrate a first preferred embodiment of a multi-functional separator in accordance with the present invention.

FIGS. 6a–6f illustrate a seventh preferred embodiment of a multi-functional separator in accordance with the present invention.

FIGS. 7a–7e illustrate a tenth preferred embodiment of a multi-functional separator in accordance with the present invention.

DETAILED DESCRIPTION

The present invention provides a multi-functional channel separator and channel combiner which is easily aligned. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 8 in conjunction with the discussion below.

Figure 1A:
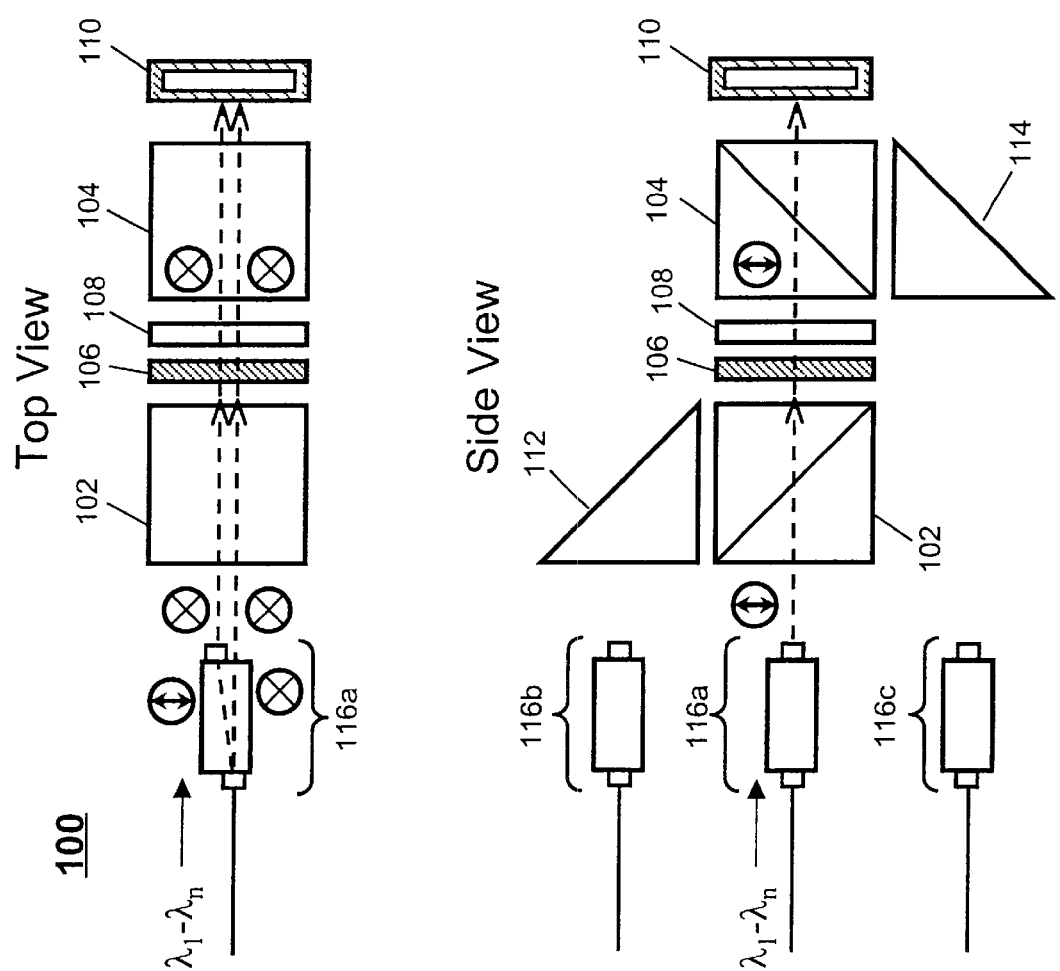

FIG. 1a illustrates a first preferred embodiment of a multi-functional separator in accordance with the present invention. The first preferred embodiment provides a 1×2 channel separator 100. As will become apparent from the following discussion, the channel separator 100 receives input from a first optical port 116a and separates the channels therein into a first set of channels and a second set of channels that are output from a first output optical port 116b and a second output optical port 116c, respectively. The optical ports 116a–116c are also referred to herein as polarizing ports. The separator 100 comprises a first 102 and a second 104 polarization beam splitter (PBS) between which are disposed a non-reciprocal optical rotation element 106 and a reciprocal optical rotation element 108. The first PBS 102 receives optical input from the input port 116a which is disposed adjacent to a side of the PBS 102 opposite to the non-reciprocal rotator 106 and reciprocal rotator 108. A non-linear interferometer 110 is disposed adjacent to the second PBS 104 at a side opposite to the non-reciprocal rotator 106 and reciprocal rotator 108. The input port 116a, first PBS 102, second PBS 104, non-reciprocal rotator 106, reciprocal rotator 108 and non-linear interferometer 110 are disposed along a line which defines a main axis or dimension of the channel separator 100.

Also shown in FIG. 1a, as well as in several following figures of this specification, are the polarization orientations of various signal light rays. These polarization orientations are indicated by double barbed arrows and/or crosses inscribed within circles. Unless otherwise indicated, double barbed arrows indicate light polarization along the indicated direction within the plane of the illustration, and crosses indicate light polarization normal to the plane of the page. Superimposed arrows and crosses either indicate non-polarized or randomly polarized light or superimposed rays which, in projection, have mutually perpendicular polarization plane orientations.

As shown in the side view of FIG. 1a, a first 112 and a second 114 optical reflector are disposed adjacent to respective faces of the first PBS 102 and second PBS 104, neither of which faces intersect the main axis of the separator 100. The optical reflectors 112–114 comprise right-angle prisms, but could also comprise mirrors. The two PBS's 102–104 each have the property of transmitting signal light comprising a first polarization (p-polarization) therethrough along the main axis whilst simultaneously deflecting signal light comprising a second polarization (s-polarization) to the adjacent optical reflector. Finally, the first output port 116b and the second output port 116c are disposed such that they receive light deflected by the first 112 and second 114 optical reflector, respectively.

Figure 1B:
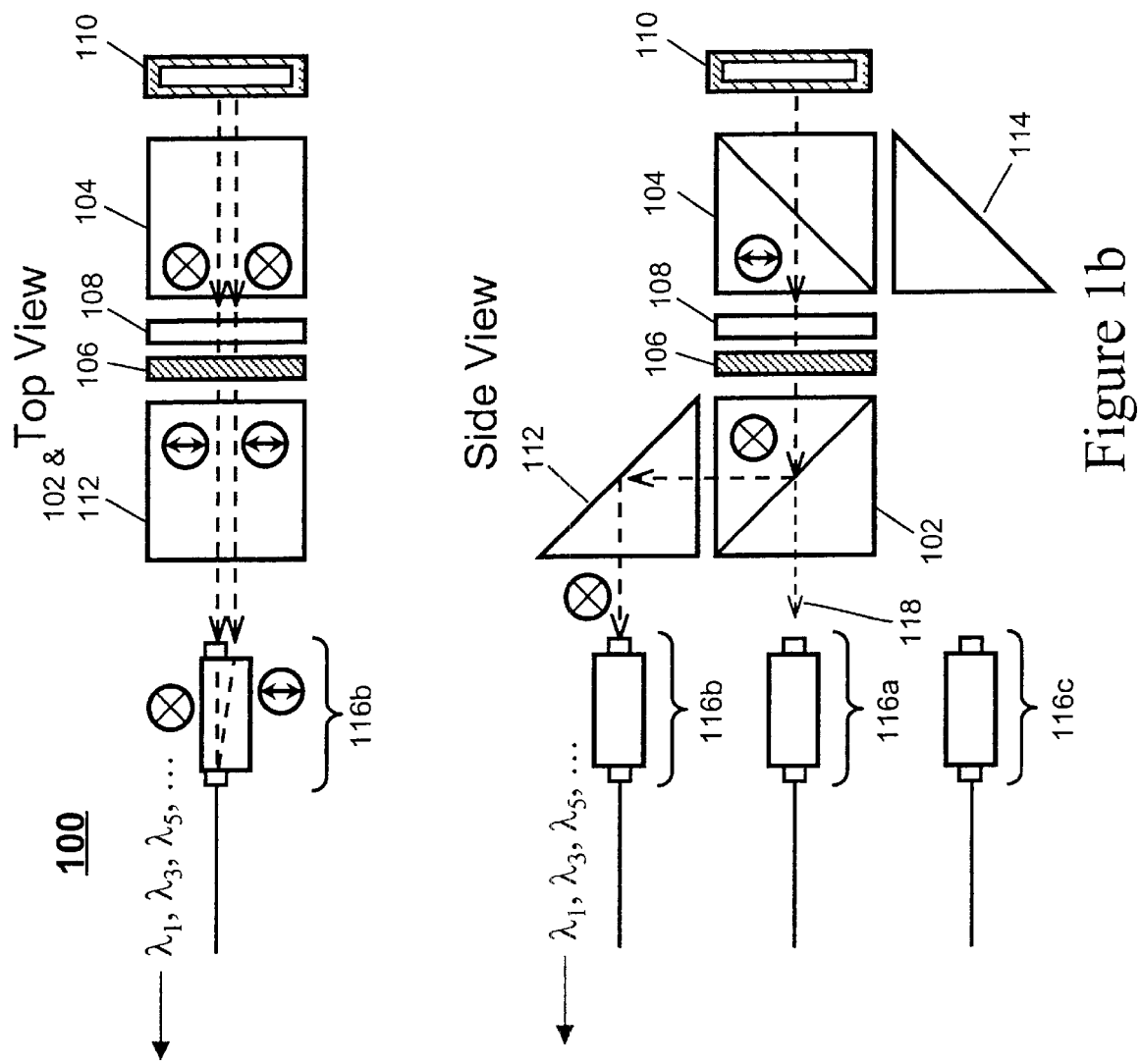
Figure 1D:
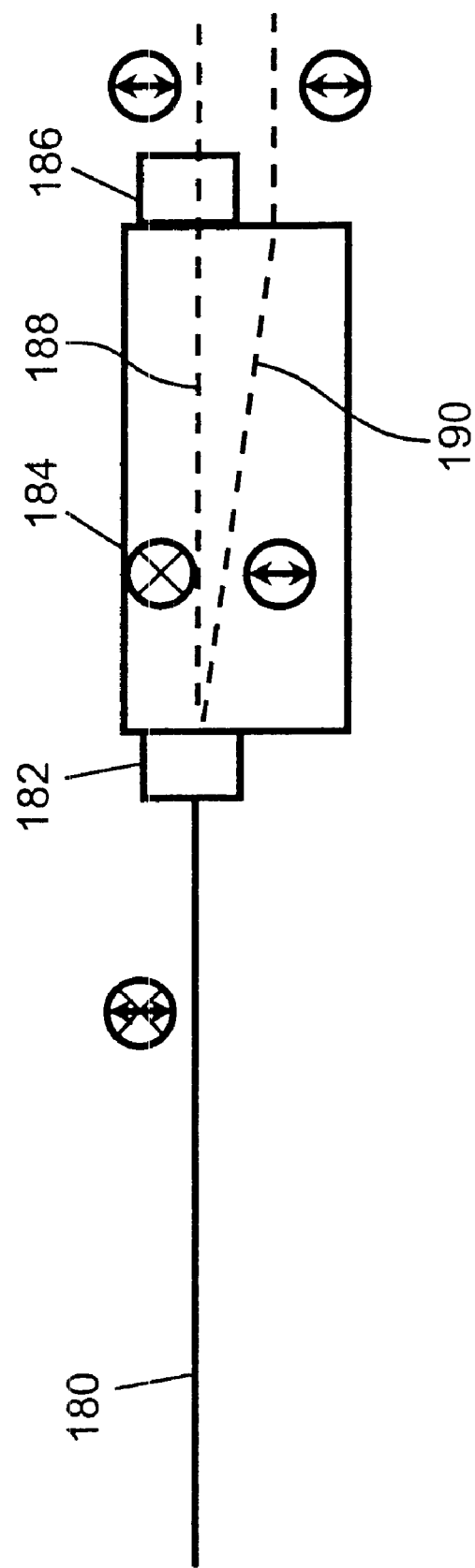
FIG. 1d illustrates in more detail the structure of a polarizing port which is utilized either for input or output in the first preferred embodiment of the multi-functional separator in accordance with the present invention.

FIG. 1d illustrates in more detail the structure of a polarizing port 116, which is utilized either for input or output in the first preferred embodiment of the multi-functional separator in accordance with the present invention. The port 116 is herein termed a "polarizing port" because the port outputs light comprising only a single linear polarization orientation and can only receive light comprising the same linear polarization orientation. Unless otherwise specified, all references to "ports" within this specification are to be understood as referring to polarizing ports of the type illustrated in FIG. 1d. The polarizing port 116 comprises an optical fiber 180, an optical collimator 182, a birefringent walk-off plate 184 and a reciprocal optical rotator 186. The optical collimator 182 is optically coupled to the optical fiber 180 and either receives input from or directs output to the fiber 180. When the optical fiber 180 is utilized to deliver input light, the collimator 182 receives diverging light rays and sets these rays parallel to one another so as to form a light beam. When the optical fiber 180 receives output light, the collimator 182 focuses a beam of collimated light into the end face of the fiber 180.

The birefringent walk-off plate 184 of the polarizing port 116 (FIG. 1d) is optically coupled to the collimator 182 at a side opposite to the fiber 180 and has the property of physically separating an unpolarized light beam received from collimator 182 into a deflected light beam 190 and an un-deflected light beam 188. The deflected light 190 comprises an e-ray having a first linear polarization orientation and the un-deflected light 188 comprises an o-ray having a second linear polarization orientation perpendicular to that of the e-ray.

Immediately after passing through the birefringent walk-off plate 184 of the polarizing port 116 (FIG. 1d), the two beams 188–190 emerge parallel to one another but have mutually orthogonal polarization orientations. The reciprocal optical rotator 186, which is optically coupled to the birefringent walk-off plate 184 at a side opposite to the collimator 182, is disposed so at to intercept the path of only one of the two beams 188–190. The reciprocal optical rotator 186 rotates the polarization orientation of said intercepted beam by 90° so as to be parallel to that of the other beam. In the reverse light propagation direction, that is, when the polarizing port 116 is utilized as an output port, the optical rotator 186 rotates the polarization orientation of only one of two beams so that the beams subsequently comprise mutually orthogonal polarization orientations and such that these two beams are subsequently combined upon passage through the birefringent walk-off plate 184. The reciprocal optical rotator 186 may be disposed so as to intercept either the o-ray 188 or the e-ray 190.

Referring once again to FIG. 1a, the pathways and polarization orientations of forward propagating input signal rays are shown in both top view (top diagram) and side view (lower diagram). The full set of two input beams, as separated by input port 116a, is only visible in the top view.

Signal light, which is comprised of a plurality of wavelength division multiplexed channels $\lambda_1$–$\lambda_n$ is input to the first PBS 102 of channel separator 100 through input port 116a such that the two separated input beams both comprise p-polarization with respect to the first PBS 102. These two p-polarized signal light beams both pass straight through the PBS 102 and subsequently pass through the combination of the non-reciprocal optical rotator 106 and the reciprocal optical rotator 108. The elements 106–108 are disposed such that light passing through both from left to right does not experience polarization plane rotation. Thus, the signal light remains p-polarized with respect to the second PBS 104 and passes directly therethrough so as to be input to the nonlinear interferometer 110. The non-linear interferometer 110 is disclosed in a co-pending United States Patent Applications titled "Nonlinear Interferometer for Fiber Optic Wavelength Division Multiplexers Utilizing a Phase Differential Method of Wavelength Separation", Ser. No. 09/247,253, filed Feb. 10, 1999, and titled "Dense Wavelength Division Multiplexer Utilizing an Asymmetric Pass Band Interferometer", Ser. No. 09/388,350, filed on Sep. 1, 1999. These patent applications are incorporated herein by reference in their entirety.

FIGS. 1b and 1c illustrate the return pathways (that is, the pathways after reflection from and interaction with the non-linear interferometer 110) of odd and even channels, respectively, through the first preferred embodiment of the multi-functional separator 100 in accordance with the present invention. The non-linear interferometer 110 has the property of reflecting all linearly polarized light input thereto such that reflected light comprising a first set of channels (e.g., the "odd" channels) that is interleaved with a second set of channels is reflected without any polarization plane rotation whereas the reflected light comprising the second set of channels (e.g., the "even" channels) is reflected with a 90° polarization plane rotation. Thus, as illustrated in the lower diagram of FIG. 1b, the light of the reflected odd channels, whose polarization is not rotated, remains p-polarized with respect to the second PBS 104 and therefore passes without deflection directly through the PBS 104 towards the reciprocal optical rotator 108 and non-reciprocal optical rotator 106. Contrariwise, as illustrated in the lower diagram of FIG. 1c, the light of the reflected even channels, whose polarization plane is rotated by 90° upon reflection from non-linear interferometer 110, is s-polarized with respect to the second PBS 104 and therefore is deflected towards the second optical reflector 114.

During passage from right-to-left through the pair of elements 106–108, the polarization plane orientation of the light of the odd channels (FIG. 1b) is rotated by 90° and thus acquires s-polarization with respect to the first PBS 102. The first PBS 102 therefore deflects this light comprising the odd channels towards the first optical reflector 112. Thus, as illustrated in FIG. 1b and FIG. 1c, the odd channels are deflected by first reflector 112 so as to be output to the first output port 116b whereas the even channels are simultaneously deflected by second reflector 114 so as to be output to the second output port 116c. As described previously, the two physically separate beams comprising each set of output channels are recombined by each respective output port and focused into the respective fiber of said port. In this fashion the separator 100 behaves as a wavelength division de-multiplexer.

As illustrated in FIG. 1b, it is possible that a small, unwanted proportion 118 of s-polarized signal light may pass straight through the PBS 102 in the direction of port 116a as a result of imperfect separation of polarized light by PBS 102 and/or PBS 104. However, this small, unwanted proportion 118 of light is effectively prevented from being output from channel separator 100 through the port 116a as a result of the fact that the small proportion 118 is polarized perpendicularly to the polarization orientation than can be received by port 116a.

Figure 1E:
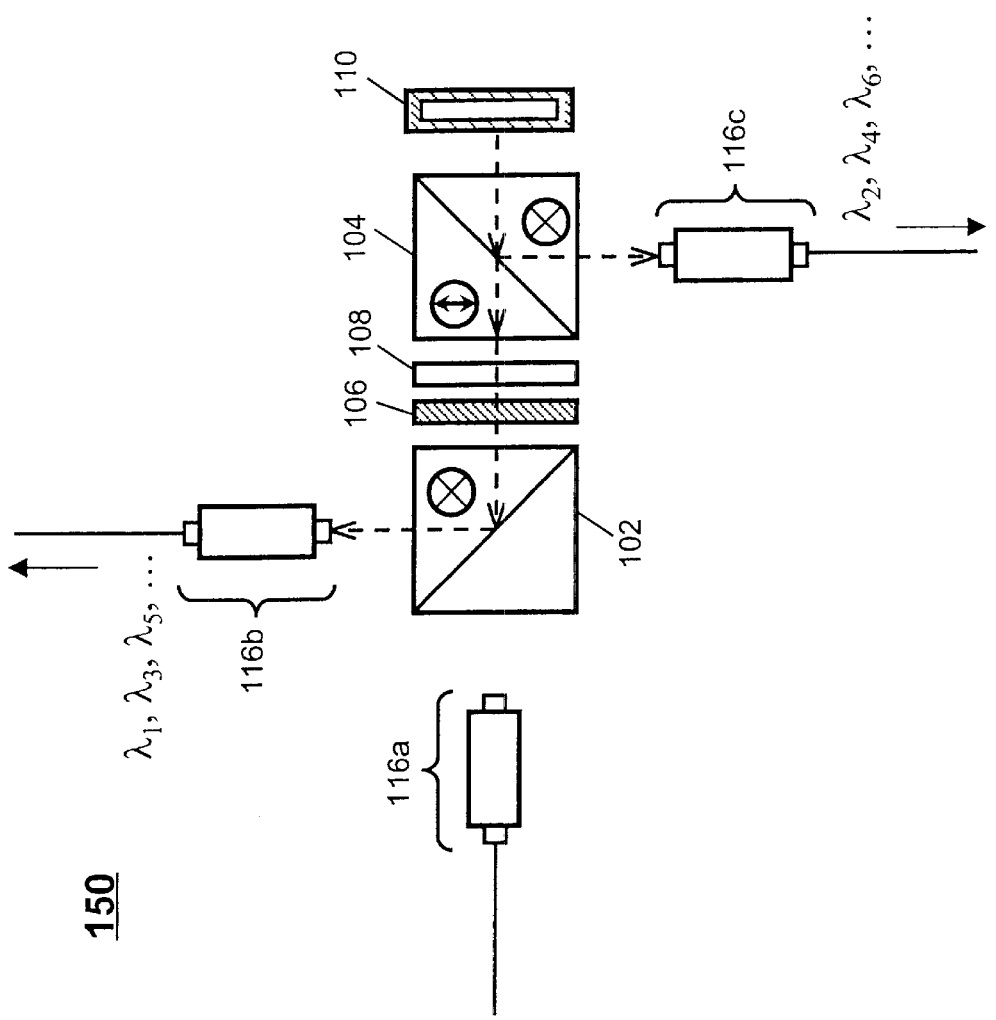
FIG. 1e illustrates a second preferred embodiment of a multi-functional separator in accordance with the present invention.

FIG. 1e illustrates a second preferred embodiment of a multi-functional separator in accordance with the present invention. The second preferred embodiment provides a 1×2 channel separator 150. The channel separator 150 is constructed and operates similarly to the channel separator 100 (FIGS. 1a–1c) except that the optical reflectors 112–114 of channel separator 100 are removed and the output ports 116b and 116c are disposed adjacent to the polarization beam splitters 102 and 104, respectively. The channel separator 150 has the advantage, over separator 100 (FIGS. 1a–1c) of fewer optical components. Other aspects of the operation of channel separator 150 are similar to those of channel separator 100 and are not repeated. Many other similar modifications, in which the beam direction is modified, folded or unfolded as the result of insertion or removal of a simple beam reflection or offset element, would be readily apparent to one of ordinary skill in the art. All such modifications to any of the described embodiments of the present invention are considered to be within the spirit and scope of the present invention.

Figure 1F:
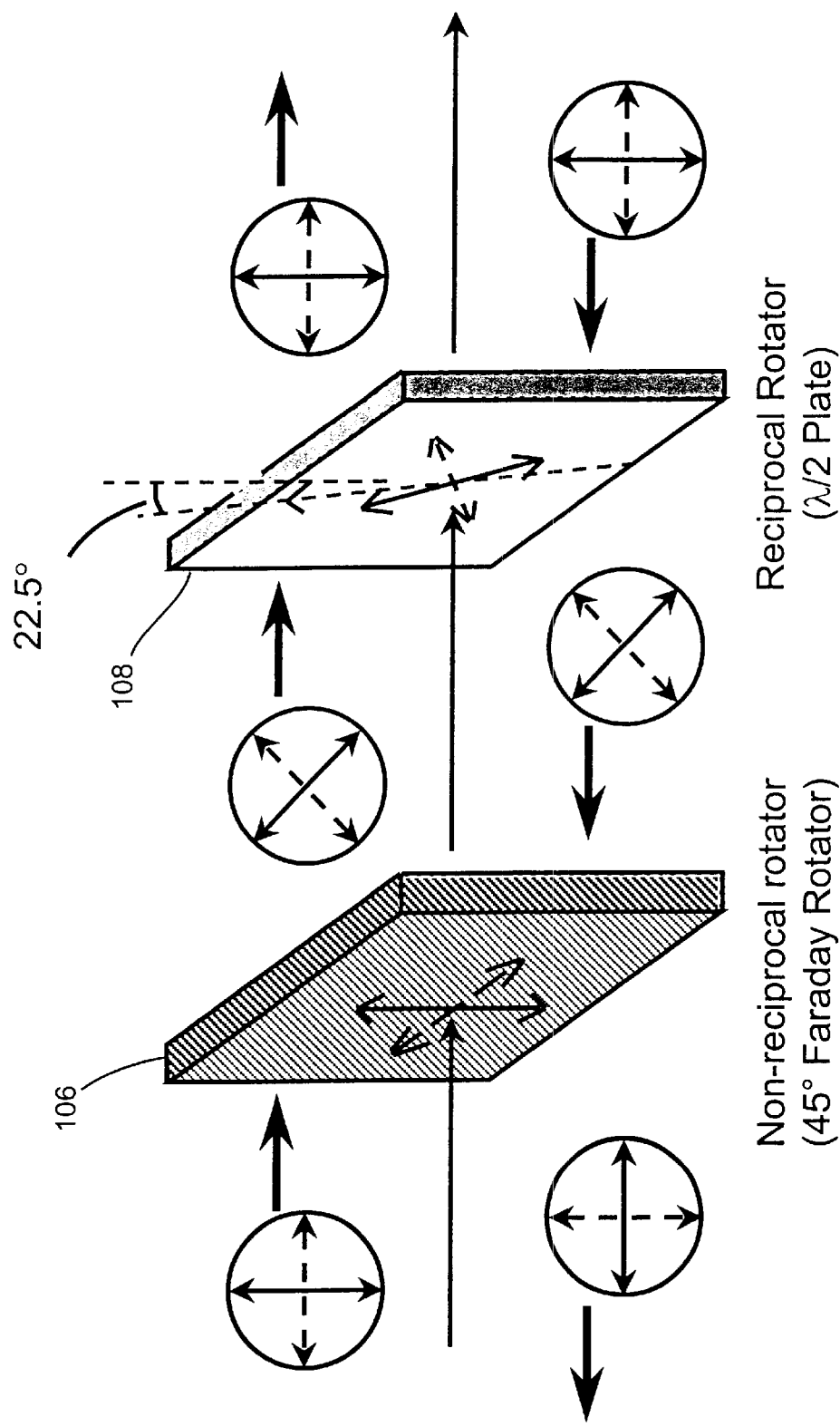
FIG. 1f illustrates a detailed perspective view of light polarization rotation upon propagation through a non-reciprocal optical rotation element together with a reciprocal optical rotation element.

FIG. 1f illustrates a detailed perspective view of light polarization rotation upon propagation through a non-reciprocal optical rotation element together with a reciprocal optical rotation element. In particular, FIG. 1f illustrates one possible configuration in which the non-reciprocal optical rotator 106 comprises a Faraday rotator that rotates the polarization plane of linearly polarized light by 45° counter clockwise (as viewed from the left side of the apparatus) and the reciprocal optical rotator 108 comprises a half-wave plate with its optical axis disposed at 22.5° to the vertical. Other configurations are also possible and the invention is not meant to be limited to the particular disposition of these two components shown in FIG. 1f.

The 45 degree Faraday rotation element (FIG. 1f), which is well-known in the art, is typically comprised of a ferromagnetic oxide crystal such as yttrium iron garnet (YIG) or else of a diamagnetic glass with a high lead oxide content, or a paramagnetic glass or cubic crystal containing various ions such as trivalent cerium or terbium. The optical rotation of the Faraday rotator typically occurs in response to an externally applied axial magnetic field provided by adjacent permanent magnets or an electro-magnet (not shown). In FIG. 1f, double-barbed arrows inscribed within circles represent the orientations of linearly polarized light as viewed from the left side of the pair of components. Two possible polarization orientations are shown inscribed within each circle, wherein one such polarization orientation is indicated by a dashed arrow for ease of reference. The non-reciprocal optical rotator 106 always rotates the polarization plane of light passing therethrough in either direction by 45° counter clockwise (as viewed from the left side of the apparatus) and, for the illustrated polarization orientations, the reciprocal optical rotator 108 always rotates the polarization plane of light passing therethrough by 45° clockwise (as viewed from the side at which the light enters the rotator 108). By tracing the polarization orientations in either direction through the two optical rotators, it can be seen that the net polarization plane rotation is zero for light propagating from left to right through both rotators 106–108 and is 90° for light propagating from right to left through both rotators.

Figure 2A:
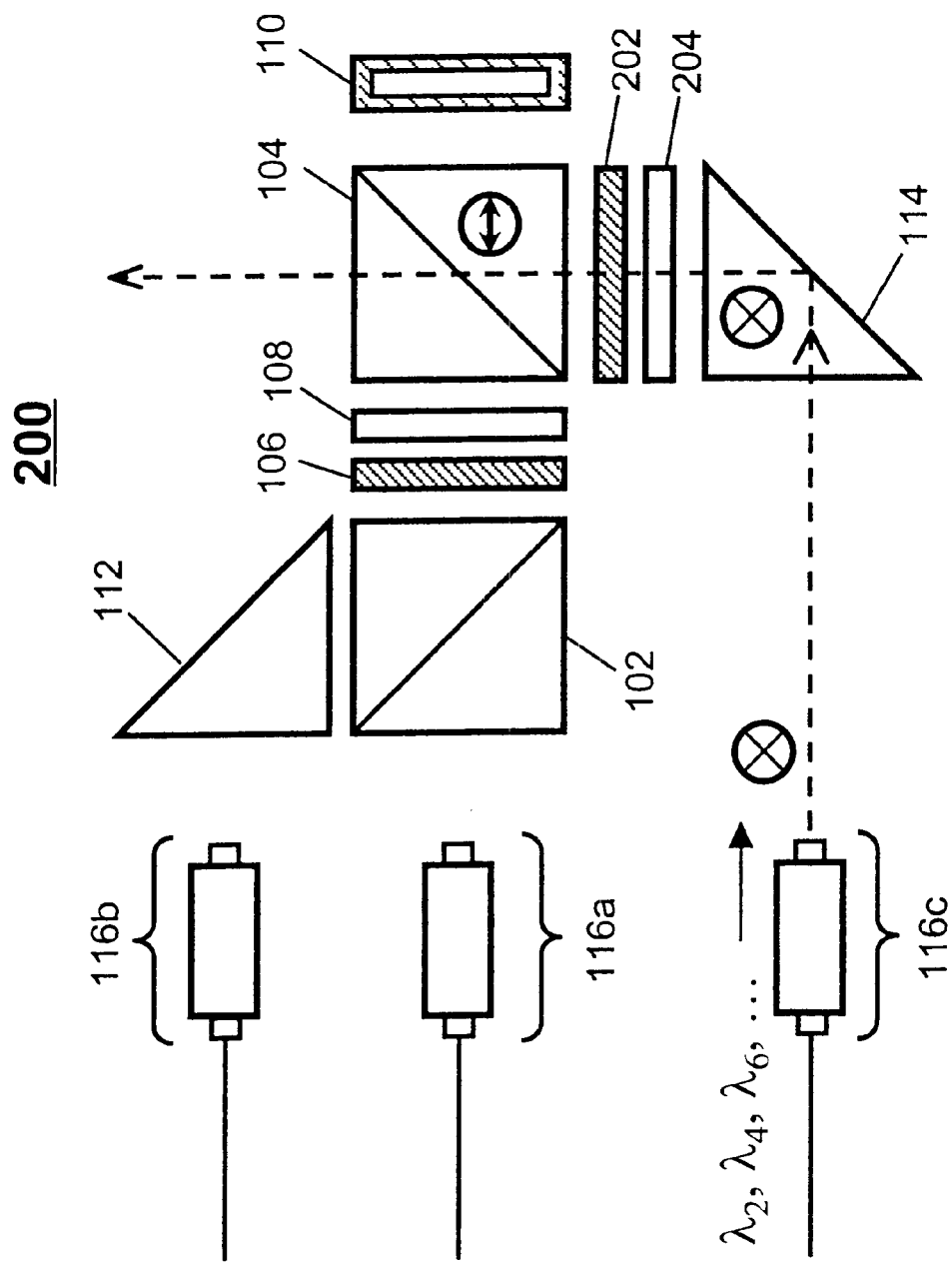
FIGS. 2a–2b illustrate a third preferred embodiment of a multi-functional separator in accordance with the present invention.
Figure 2B:
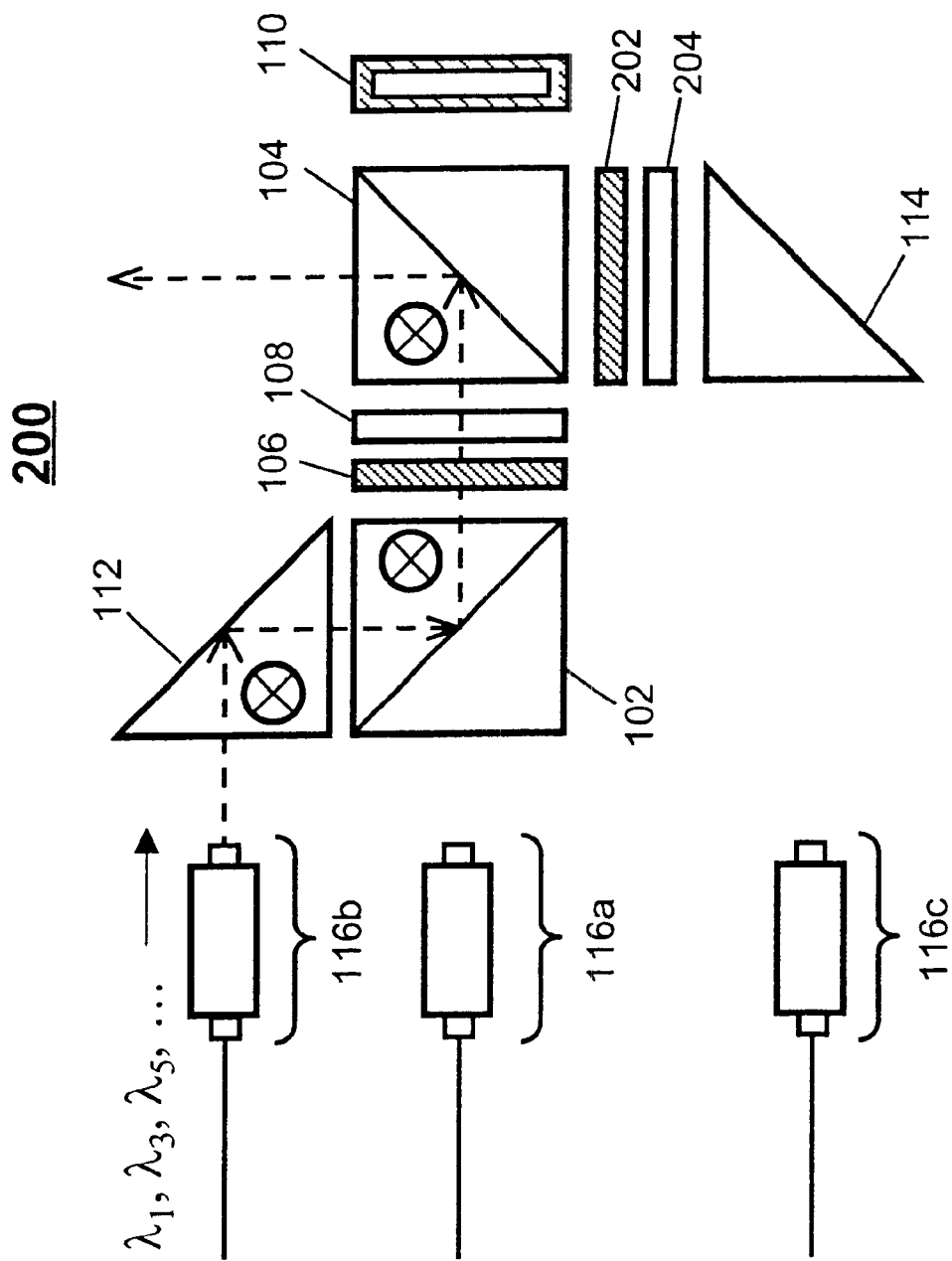

FIGS. 2a–2b illustrate a third preferred embodiment of a multi-functional separator in accordance with the present invention. The third preferred embodiment provides a 1×2 dense wavelength division de-multiplexer and an optical isolator. The channel separator 200 illustrated in FIGS. 2a–2b comprises all the components and functionality previously described in reference to the channel separator 100 (FIGS. 1a–1c). Therefore the common components are shown with similar reference numbers to those in channel separator 100 and the common functionality is not re-described. However, the channel separator 200 comprises an extra non-reciprocal optical rotator 202 and a reciprocal optical rotator 204 disposed between the second PBS 104 and the second optical reflector 114 as shown in FIGS. 2a–2b. The pair of components 202–204 comprises the property such that linearly polarized light passing completely therethrough from top to bottom does not experience polarization plane rotation whereas linearly polarized light passing completely therethrough from bottom to top incurs a 90°-polarization plane rotation.

The channel separator 200 (FIGS. 2a–2b) comprises an additional optical isolator functionality relative to the channel separator 100 (FIGS. 1a–1c). Thus, signal light inadvertently input to the channel separator 200 from one or the other of the output ports 116b–116c as a result of reflections from optical surfaces or light back scattering is prevented from returning to the input port 116a. FIGS. 2a and 2b respectively illustrate the pathways through channel separator 200 of light input to the separator from the second output port 116c and from the first output port 116b.

As shown in either FIG. 2a or FIG. 2b, light input from either of the output ports 116b–116c is polarized perpendicularly to the plane of the respective diagram as a result of the polarization functionality of said ports. Light input from second output port 116c comprises s-polarization with respect to the second optical reflector 114 and is deflected by the optical reflector towards and through the reciprocal optical rotator 204 and the non-reciprocal optical rotator 202 to the second PBS 104. The pair of components 202–204 comprises the property such that linearly polarized light passing completely therethrough from bottom to top incurs a 90° polarization plane rotation and thus the signal light from port 116c is transformed to p-polarization with respect to the second PBS 104. As shown in FIG. 2a, this p-polarized light passes completely through the second PBS 104 so as to exit the apparatus without being directed towards the input port 116a.

As illustrated in FIG. 2b, light input from the first output port 116b to channel separator 200 comprises s-polarization with respect to the first optical reflector 112 and the first PBS 102. This light is thus deflected by both the optical reflector 112 and the first PBS 102 towards and through the non-reciprocal optical rotator 106 and the reciprocal optical rotator 108 to the second PBS 104. The pair of components 106–108 comprises the property such that linearly polarized light passing completely therethrough from left to right does not incur polarization plane rotation and thus the signal light from port 116b remains s-polarized with respect to the second PBS 104. As shown in FIG. 2b, the second PBS 104 reflects this s-polarized light so as to exit the channel separator 200 without being directed towards the input port 116a. In this fashion, the channel separator 200 performs as an optical isolator.

Figure 3A:
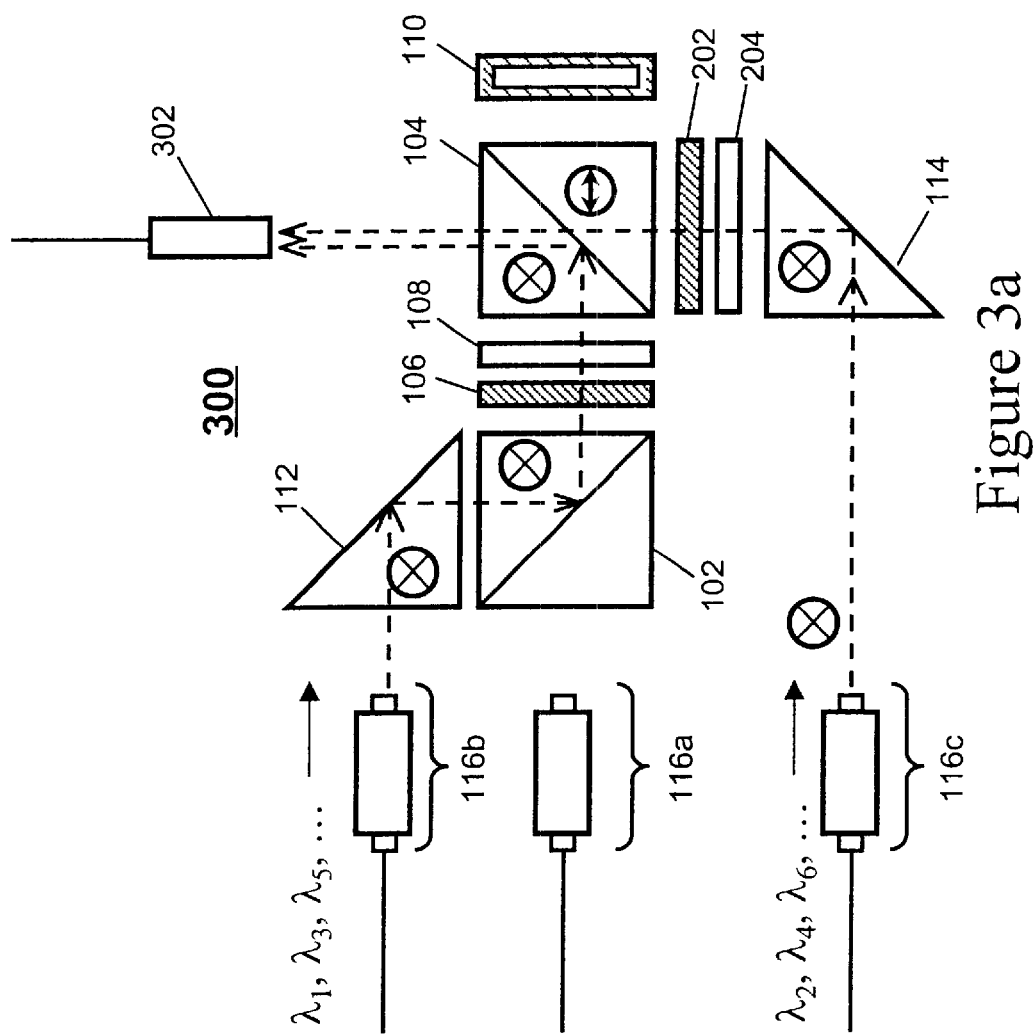
FIGS. 3a–3b illustrate a fourth preferred embodiment of a multi-functional separator in accordance with the present invention.

FIG. 3a illustrates a fourth preferred embodiment of a multi-functional separator in accordance with the present invention. The fourth preferred embodiment provides a 1×2 dense wavelength division de-multiplexer and an optical circulator. FIG. 3a illustrates a side view of the separator/circulator 300. The separator/circulator comprises all the components of channel separator 200 (FIG. 2a) together with one additional component—an additional output port 302. The output port 302 does not comprise a polarizing port of the type illustrated in FIG. 1d and may be a conventional optical port comprising a collimating lens optically coupled to an optical fiber. The components common to channel separator 200 and separator/circulator 300 are numbered similarly in FIGS. 2a, 2b and 3a. Further, the odd/even channel separation functionality of separator/circulator 300 is similar to that of channel separator 100 (FIGS. 1a–1c) and that of channel separator 200 (FIGS. 2a–2b) and is not re-described here. Further, the pathways of light input from ports 116b–116c to and through the separator/circulator 300 are identical to those already described for channel separator 200 (FIGS. 2a–2b) except that, upon exit from the separator/circulator 300, the light is output to the output port 302. Because superimposed light beams comprising two polarizations are delivered to the output port 302, this port 302 comprises a simple collimator and optical fiber and does not comprise an optical rotator or birefringent walk-off plate. The apparent spatial offset between the two beams delivered to port 302 shown in FIG. 3a is provided for illustration purposes only, and is not real. In fact, the two beams delivered into the output port 302 are superimposed one upon the other.

Figure 3B:
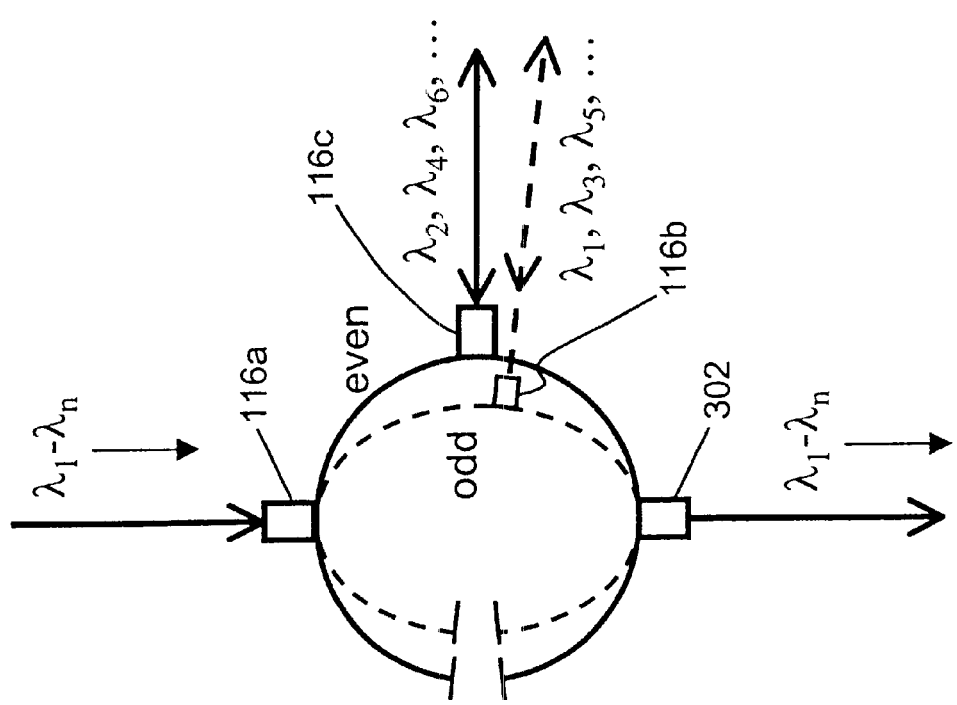

FIG. 3b illustrates the signal routing performed by the fourth preferred embodiment of the multi-functional separator in accordance with the present invention. In the separator/circulator 300, as shown in FIG. 3b, the port 116a comprises an input port, the port 302 comprises an output port and the ports 116b–116c comprise ports utilized for both input and output. Light comprising a plurality of wavelength division multiplexed channels $\lambda_1$–$\lambda_n$ input to separator/circulator 300 through input port 116a is separated into two sets of channels—a set of "odd" channels $\lambda_1, \lambda_3, \lambda_5,$ ... which is directed to and output from the input/output port 116b and a set of "even" channels $\lambda_2, \lambda_4, \lambda_6,$ ... which is directed to and output from the input/output port 116c—by separator/circulator 300. Simultaneously with or alternatively to this channel separation, channels may be input to the separator/circulator 300 through one or both of the input/output ports 116b–116c. Such channels, input from either port 116b or 116c, are not directed to port 116a but are instead directed to output port 302 so as to be output from the separator/circulator 300. In this fashion, the separator/circulator 300 simultaneously functions as both a channel separator and as a pair of three-port optical circulators—one circulator (dashed lines in FIG. 3b) for odd channels and a second circulator (solid lines in FIG. 3b) for even channels.

Figure 4A:
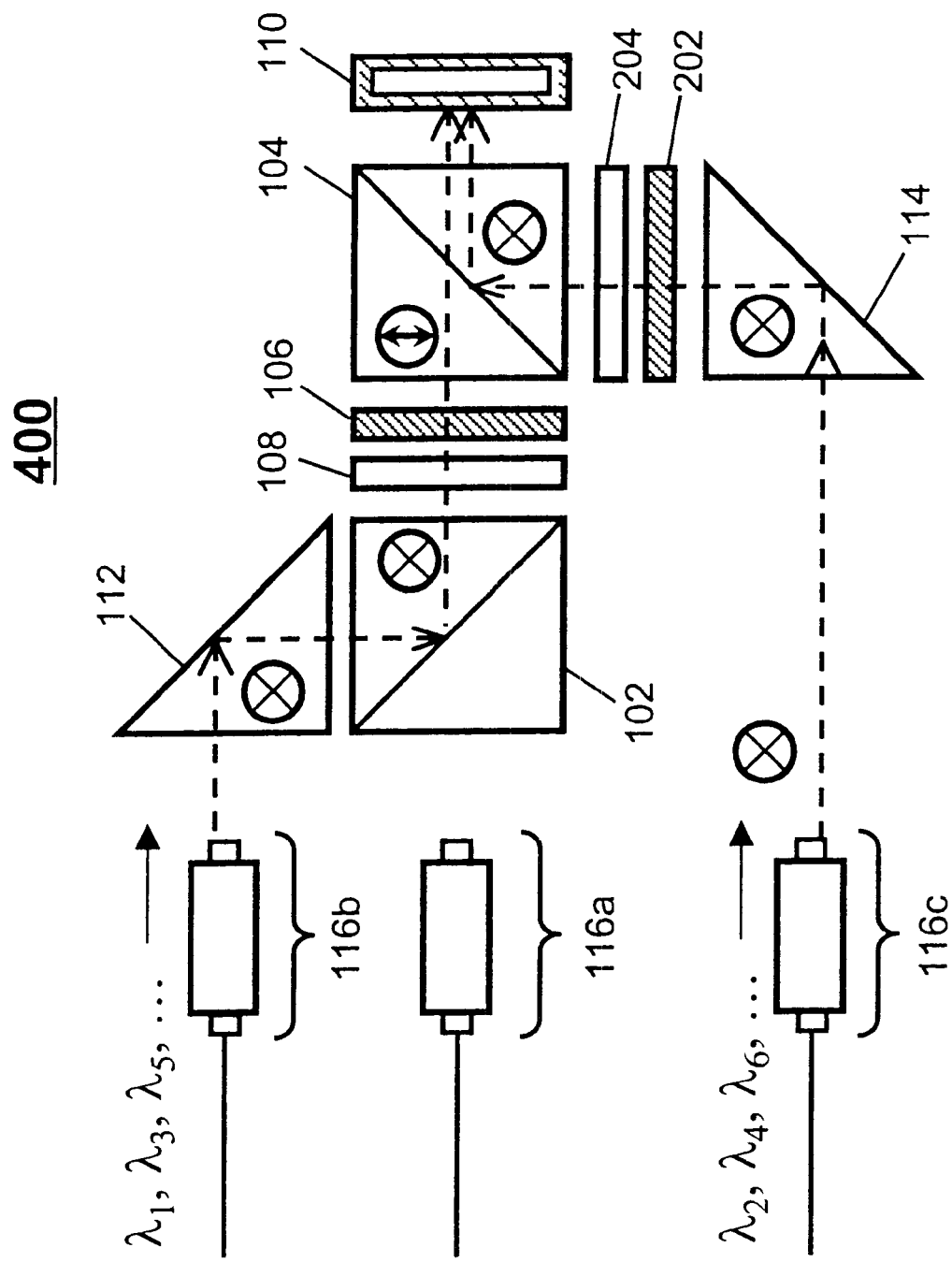
FIGS. 4a–4c illustrate a fifth preferred embodiment of a multi-functional separator in accordance with the present invention.
Figure 4B:
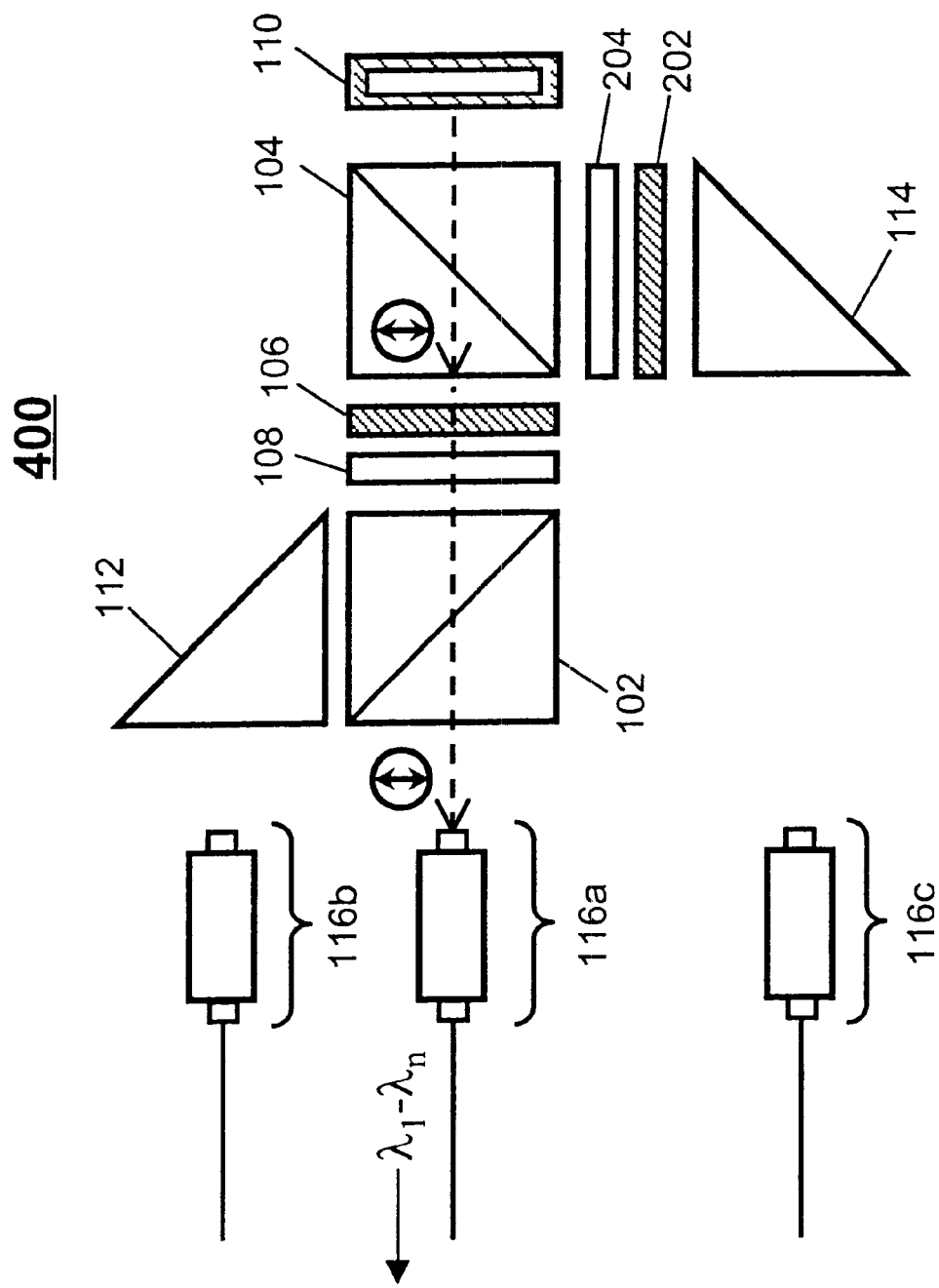
Figure 4C:
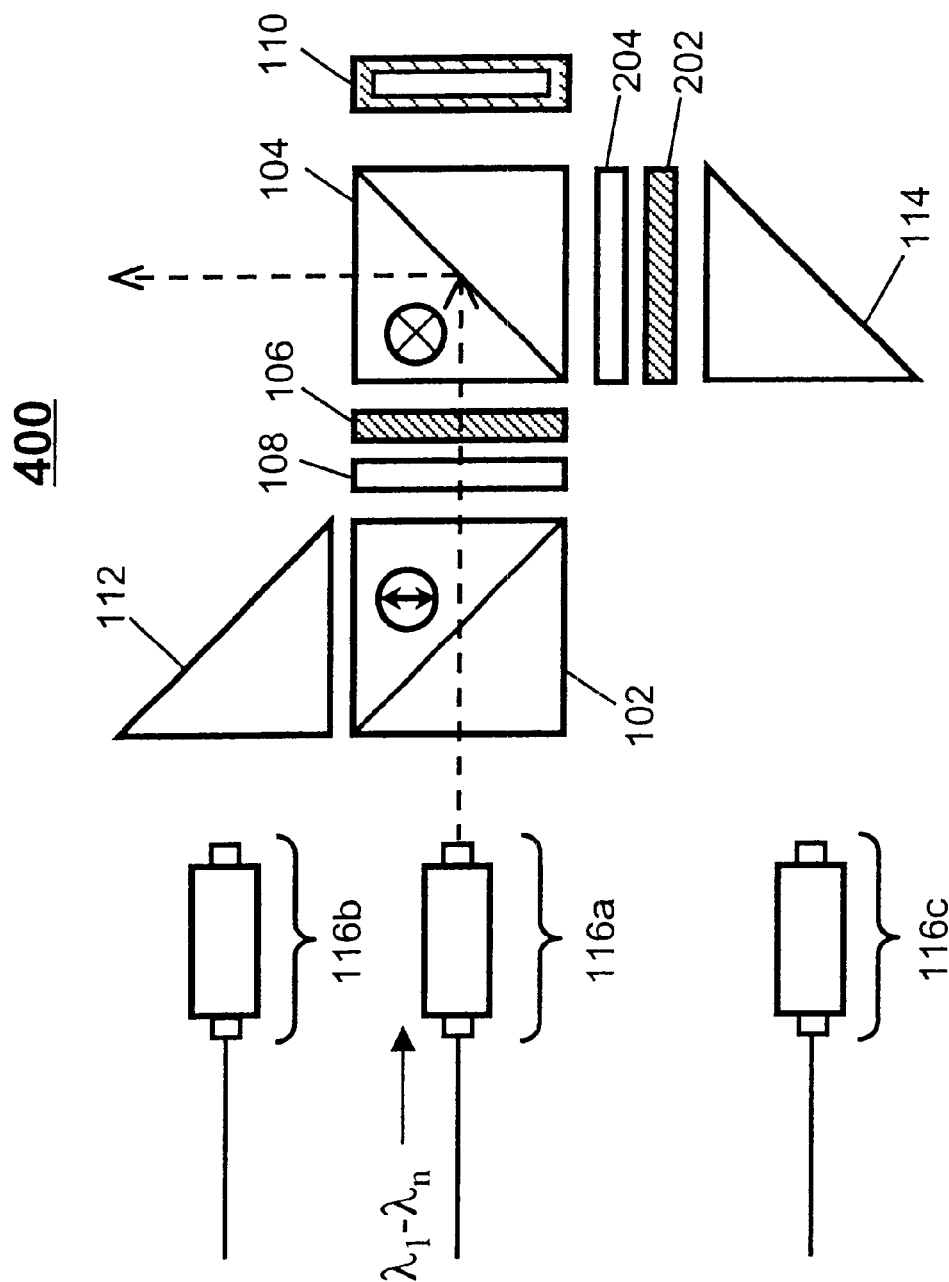

FIGS. 4a–4c illustrate a fifth preferred embodiment of a multi-functional separator in accordance with the present invention. The fifth preferred embodiment provides a 2×1 dense wavelength division multiplexer as well as an optical isolator. The multiplexer 400 (FIGS. 4a–4c) is identical in construction to the channel separator 200 (FIGS. 2a–2b) except that each adjacent pair of optical rotators functions in the reverse sense from the corresponding pair of rotators in the channel separator 200. For example, in the multiplexer 400, the pair of optical rotators 106–108 rotates by 90° the polarization plane of light propagating therethrough from left to right, instead of from right to left as in channel separator 200. This reverse-sense operation also applies for the pair of optical rotators 202–204. In this specification, a drafting convention is adopted such that the polarization orientation of linearly polarized light is rotated by 90° upon passing through a reciprocal and a non-reciprocal optical rotator in sequence but experiences no net rotation upon passing through a non-reciprocal and a reciprocal optical rotator in sequence. Thus, in FIGS. 4a–4c, the reverse-sense operation of the pair of optical rotators is illustrated by simple interchange of the positions of the two optical rotators within each pair of rotators 106–108 and 202–204. However, one of ordinary skill in the art will readily envision many alternative means of accomplishing the forward-sense and the reverse-sense operations of the optical rotators. Neither the multiplexers nor the demultiplexers in accordance with the present invention need be limited to any particular sequence of optical rotators within a pair of adjacent optical rotators.

In the multiplexer 400 (FIGS. 4a–4b), the ports 116b and 116c serve to input signal light comprising odd channels and even channels, respectively, to the apparatus 400 and the port 116a serves to output signal light from the multiplexer 400. Because of the disposition of the rotators 106–108 in multiplexer 400, linearly polarized light passing completely through the pair of rotators 106–108 from right to left does not experience polarization plane rotation whereas linearly polarized light passing completely therethrough from left to right incurs a 90°-polarization plane rotation. Further, because of the disposition of the rotators 202–204 in multiplexer 400, linearly polarized light passing completely through the pair of rotators from bottom to top does not experience polarization plane rotation whereas linearly polarized light passing completely therethrough from top to bottom incurs a 90°-polarization plane rotation.

FIG. 4a illustrates the forward pathways—that is, pathways up to the non-linear interferometer 110—of signal light rays of both even and odd channels through the multiplexer 400. Light that is input to multiplexer 400 from either of the ports 116b–116c is polarized perpendicularly to the plane of the figure as a result of the polarization functionality of the ports. Light input to multiplexer 400 from port 116c comprises s-polarization with respect to the second optical reflector 114 and is deflected by the optical reflector 114 towards and through the non-reciprocal optical rotator 202 and the reciprocal optical rotator 204 to the second PBS 104. Because the polarization plane of the linearly polarized signal light comprising the even channels is not rotated upon passing through rotators 202–204 from bottom to top, this signal light remains s-polarized with respect to the second PBS 104 and is reflected towards the non-linear interferometer 110. Light that is input to multiplexer 400 from the port 116b comprises s-polarization with respect to the first optical reflector 112 and the first PBS 102. This light is thus deflected by both the optical reflector 112 and the first PBS 102 towards and through the reciprocal optical rotator 108 and the non-reciprocal optical rotator 106 to the second PBS 104. Because the polarization plane of the linearly polarized signal light comprising the odd channels is rotated by 90° upon passing through rotators 106–108 from left to right, this signal light is transformed to p-polarized light with respect to the second PBS 104 and is thus transmitted through PBS 104 towards the non-linear interferometer 110.

FIG. 4b illustrates the return pathways—that is, pathways subsequent to reflection from the non-linear interferometer 110—of signal light rays of odd channels and even channels through the fifth preferred embodiment of the multi-functional separator in accordance with the present invention. Upon interaction with and reflection from the non-linear interferometer 110 the polarization plane of the signal light comprising the even channels is rotated so as to become vertically polarized whilst the polarization plane of the signal light comprising the odd channels remains vertically polarized. Therefore, as shown in FIG. 4b, the combined light comprising the odd and the even channels is reflected from non-linear interferometer 110 with vertical polarization. This vertically polarized light comprises p-polarization with respect to the second PBS 104 and thus passes completely through the second PBS 104 towards and through the non-reciprocal optical rotator 106 and the reciprocal optical rotator 108. In the multiplexer 400, the pair of components 106–108 comprises the property such that linearly polarized light passing completely therethrough from right to left does not incur polarization plane rotation and thus the returning signal light remains p-polarized with respect to the first PBS 102. As shown in FIG. 4b, this p-polarized combined signal light of odd and even channels is transmitted completely through the first PBS 102 so as to be output from the multiplexer 400 through the port 116a. In this fashion, the apparatus 400 performs as a multiplexer, such that odd channels input from port 116b and even channels input from port 116c are all output from the single port 116a.

FIG. 4c illustrates the optical isolator functionality of the fifth preferred embodiment of the multi-functional separator in accordance with the present invention. FIG. 4c illustrates the pathways through the multiplexer 400 of signal light rays inadvertently input to the apparatus from port 116a. As shown in FIG. 4c, such light rays are delivered from port 116a with vertical polarization. Since this vertical polarization comprises p-polarization with respect to the first PBS 102, this inadvertently input signal light passes completely through the first PBS 102 to and through the pair of optical rotators 106–108. In the multiplexer 400, the pair of optical rotators 106–108 comprises the property such that linearly polarized light passing completely therethrough from left to right incurs a 90°-polarization plane rotation. Therefore, upon passing through the pair of optical rotators 106–108, the inadvertently input signal light is transformed to s-polarized light with respect to the second PBS 104. As shown in FIG. 4c, the second PBS 104 reflects this s-polarized light so as to exit the multiplexer 400 without entering either of the ports 116b–116c. In this fashion, the multiplexer 400 performs as an optical isolator.

Figure 5A:
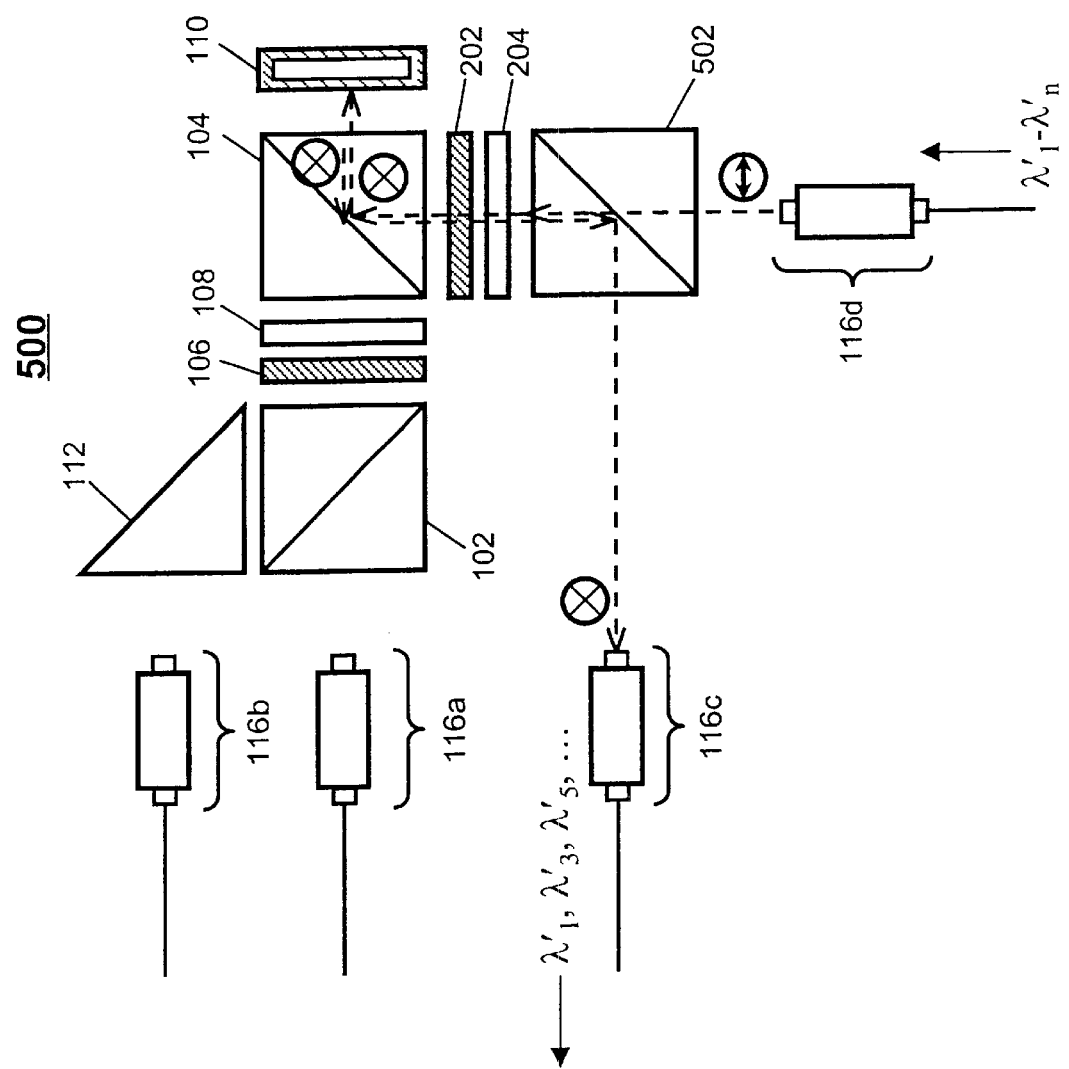
FIGS. 5a–5c illustrate side views of a sixth preferred embodiment of a multi-functional separator in accordance with the present invention.
Figure 5B:
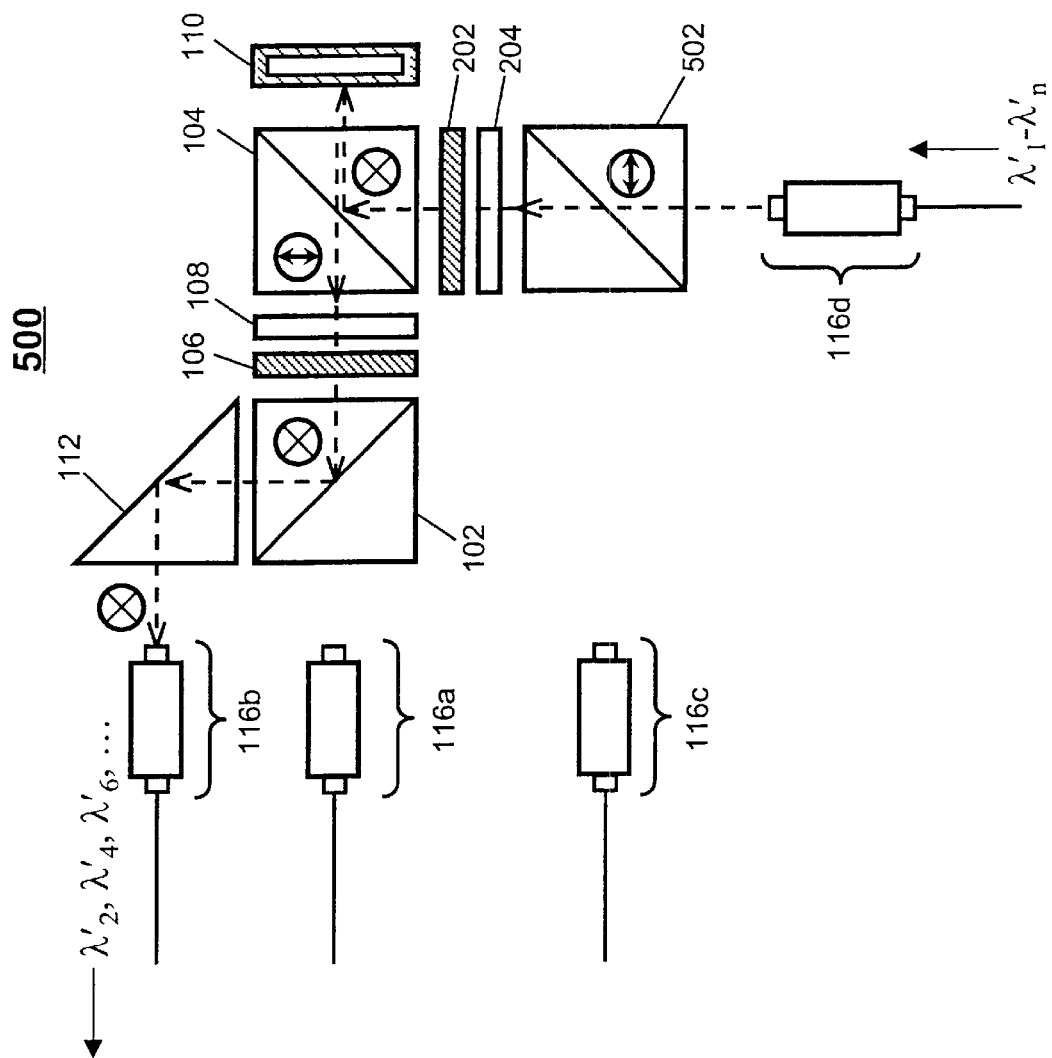
Figure 5C:
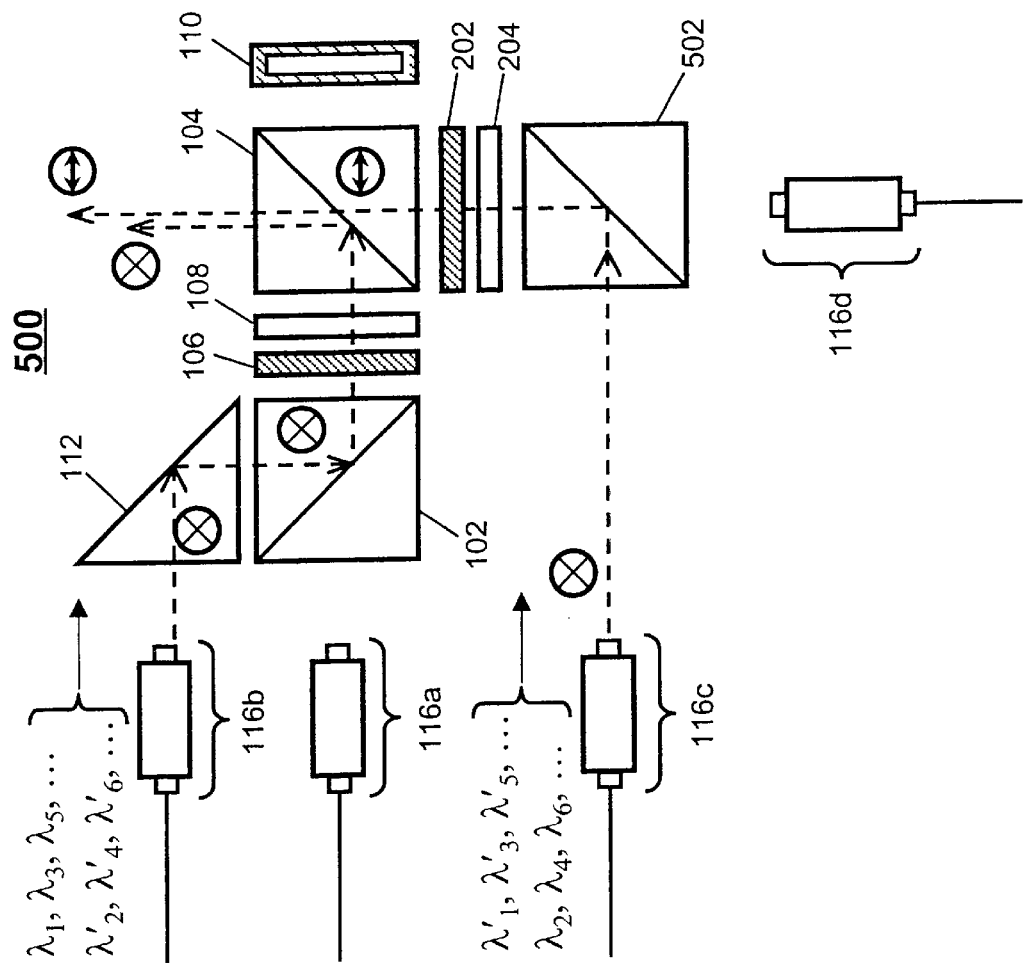

FIGS. 5a–5c illustrate side views of a sixth preferred embodiment of a multi-functional separator in accordance with the present invention. The sixth preferred embodiment provides a 2×2 dense wavelength division multiplexer and an optical isolator. In the channel separator 500, the three ports 116a–116c, first PBS 102, non-reciprocal optical rotator 106, reciprocal optical rotator 108, non-reciprocal optical rotator 202, reciprocal optical rotator 204, second PBS 104, non-linear interferometer 110 and optical reflector 112 are common to and disposed similarly to the respective similarly numbered components in the channel separator 200 (FIGS. 2a–2b) and the separator/circulator 300 (FIG. 3a). However, in the channel separator 500, a third PBS 502 replaces the optical reflector 114 (FIGS. 2a, 3a) and an additional input port 116d is optically coupled to and disposed adjacent to a face of the third PBS 502.

The functionality of the channel separator 500 with respect to a plurality of channels $\lambda_1$–$\lambda_n$ input to the channel separator 500 from input port 116a is similar to that of the channel separator 100 and the channel separator 200 and already described in reference to FIGS. 1a–1c. Thus, according to the prior discussion, the channels $\lambda_1$–$\lambda_n$ are separated into a first set of channels (e.g., "odd" channels $\lambda_1$, $\lambda_3$, $\lambda_5$, ...) that are output from the channel separator 500 via port 116b and a second set of channels interleaved with the first set (e.g., "even" channels $\lambda_2$, $\lambda_4$, $\lambda_6$, ...) that are output from the channel separator 500 via port 116c.

The channel separator 500 (FIGS. 5a–5b) comprises additional functionality beyond that of the channel separators 100 and 200 with respect to the routing of a plurality of channels $\lambda'_1-\lambda'_n$ that are input to the channel separator 500 from the second input port 116d. It is to be understood that, although the wavelengths of the channels $\lambda'-\lambda'_n$ are identical to those of the respective channels $\lambda_1-\lambda_n$ input via port 116a, the signals differ between the two sets of channels. The pathways of the odd channels $\lambda'_1, \lambda'_3, \lambda'_5, \ldots$ and of the even channels $\lambda'_2, \lambda'_4, \lambda'_6, \ldots$ through the channel separator 500 are illustrated in FIGS. 5a and 5b, respectively. The input port 116d is disposed such that the light of all channels $\lambda'_1-\lambda'_n$ is directed towards the third PBS 502 and comprises a polarization orientation corresponding to p-polarization with respect to PBS 502. The p-polarized channels $\lambda'_1-\lambda'_n$ thus pass directly through the PBS 502 and are directed towards and through the reciprocal optical rotator 204 and the non-reciprocal optical rotator 202 and thence towards the second PBS 104. The pair of components 202–204 comprises the property such that linearly polarized light passing completely therethrough from bottom to top incurs a 90° polarization plane rotation. Therefore, the signal light from port 116d is rotated and transformed to s-polarization with respect to the second PBS 104. The s-polarized signals $\lambda'_1-\lambda'_n$ are thus reflected by the second PBS 104 and directed to the non-linear interferometer 110.

As described previously, the non-linear interferometer 110 has the property of reflecting all light input thereto such that reflected light comprising the "odd" channels is reflected therefrom without any polarization plane rotation whereas the reflected light comprising the "even" channels is reflected with a 90° polarization plane rotation. Thus, as illustrated in FIG. 5a, the light of the reflected odd channels $\lambda'_1, \lambda'_3, \lambda'_5, \ldots$ whose polarization is not rotated, remains s-polarized with respect to the second PBS 104 and therefore is reflected by the PBS 104 towards and through the non-reciprocal optical rotator 202 and the reciprocal optical rotator 204. Contrariwise, as illustrated FIG. 5b, the light of the reflected even channels $\lambda'_2, \lambda'_4, \lambda'_6, \ldots$ whose polarization plane is rotated by 90° upon reflection from non-linear interferometer 110, is transformed to p-polarization with respect to second PBS 104 and therefore passes straight through the second PBS 104 towards and through the reciprocal optical rotator 108 and the non-reciprocal optical rotator 106.

Because it passes through the elements 106–108 from right to left (FIG. 5b), the light comprising the even channels $\lambda'_2, \lambda'_4, \lambda'_6, \ldots$ incurs a 90° rotation of the plane of its polarization and thus is transformed to s-polarized light with respect to the first PBS 102. These even channels comprising s-polarized light are thus reflected by the first PBS 102 in the direction of optical reflector 112 and are then reflected by optical reflector 112 towards and into the port 116b.

FIGS. 5a–5b illustrate the paths of the channels $\lambda'_1-\lambda'_n$, originally input from port 116d, through the channel separator 500. Because the channel separator 500 comprises the same functionality as that of the channel separator 100 with respect to channels $\lambda_1-\lambda_n$ input to the channel separator 100 from port 116a, FIGS. 1a–1c essentially illustrate the paths of the channels $\lambda_1-\lambda_n$ through either the channel separator 100 or the channel separator 500. By comparing FIGS. 1b–1c with FIGS. 5a–5b, it is seen that the first output port 116b receives the odd channels from the set $\lambda_1-\lambda_n$ together with the even channels from the set $\lambda'_1-\lambda'_n$ and that the second output port 116c receives the even channels from the set $\lambda_1-\lambda_n$ together with the odd channels from the set $\lambda'_1-\lambda'_n$.

FIG. 5c illustrates the pathways of inadvertently reflected signal light rays through the sixth preferred embodiment of the multi-functional separator in accordance with the present invention. Because the channel separator 500 comprises the same optical isolator components and functionality as the channel separator 200, the pathways of such inadvertently reflected channels are essentially identical to those within the separator 200 as shown in FIGS. 2a–2b and are not re-described. These channel pathways direct light that is inadvertently input to the channel separator 500 from either of the output ports 116b–116c away from either of the input ports 116a and 116d.

FIGS. 6a–6e illustrate a seventh preferred embodiment of a multi-functional separator in accordance with the present invention. The seventh preferred embodiment provides a 1×2 dense wavelength division de-multiplexer, an optical comb filter and an optical isolator. In the channel separator 600, the input port 116a, the two output ports 116b–116c, the first PBS 102, the second PBS 104, the non-linear interferometer 110, the non-reciprocal optical rotator 106, the reciprocal optical rotator 108, the non-reciprocal optical rotator 202 and the reciprocal optical rotator 204 are common to the similarly numbered components comprising the channel separator 200 (FIGS. 2a–2b). However, in the channel separator 600, the first and second optical reflectors 112–114 of channel separator 200 are replaced by a third PBS 602 and a fourth PBS 604, respectively. Additionally, a second non-linear interferometer 606 and a third non-linear interferometer 608 are respectively disposed adjacent to the third PBS 602 at a side opposite to the port 116b and adjacent to the fourth PBS 604 at a side opposite to the port 116c.

As will be described in more detail following, the channel separator 600 comprises the same channel separation and optical isolation functionalities as the channel separator 200 and further comprises an optical comb filtering functionality. The channel separation functionality performed by the components common to the separator 200 comprises a first channel separation stage and the comb filtering functionality comprises a second filtering stage sequentially cascaded with the first stage.

Figure 6A:
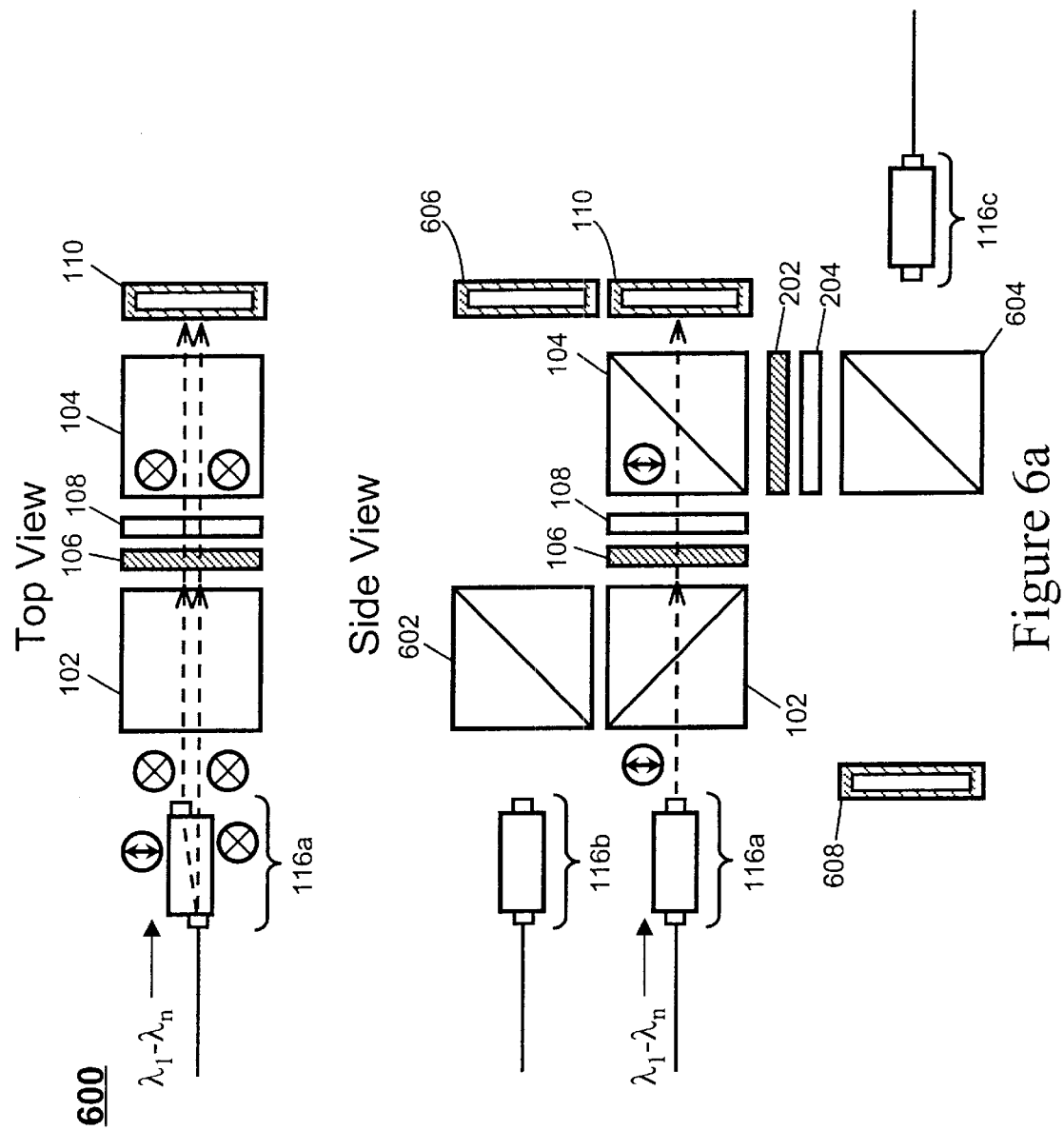
Figure 6B:
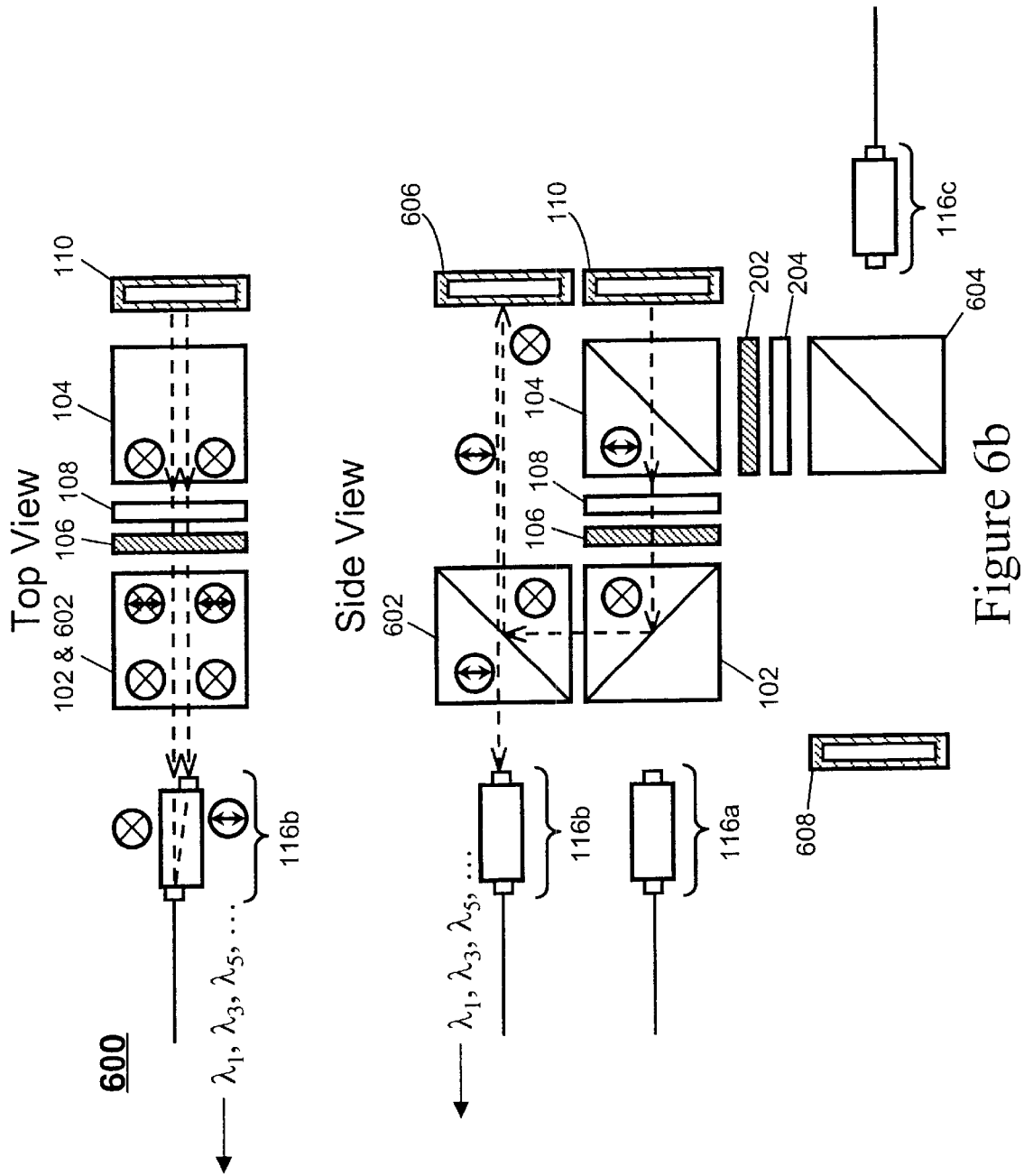
Figure 6D:
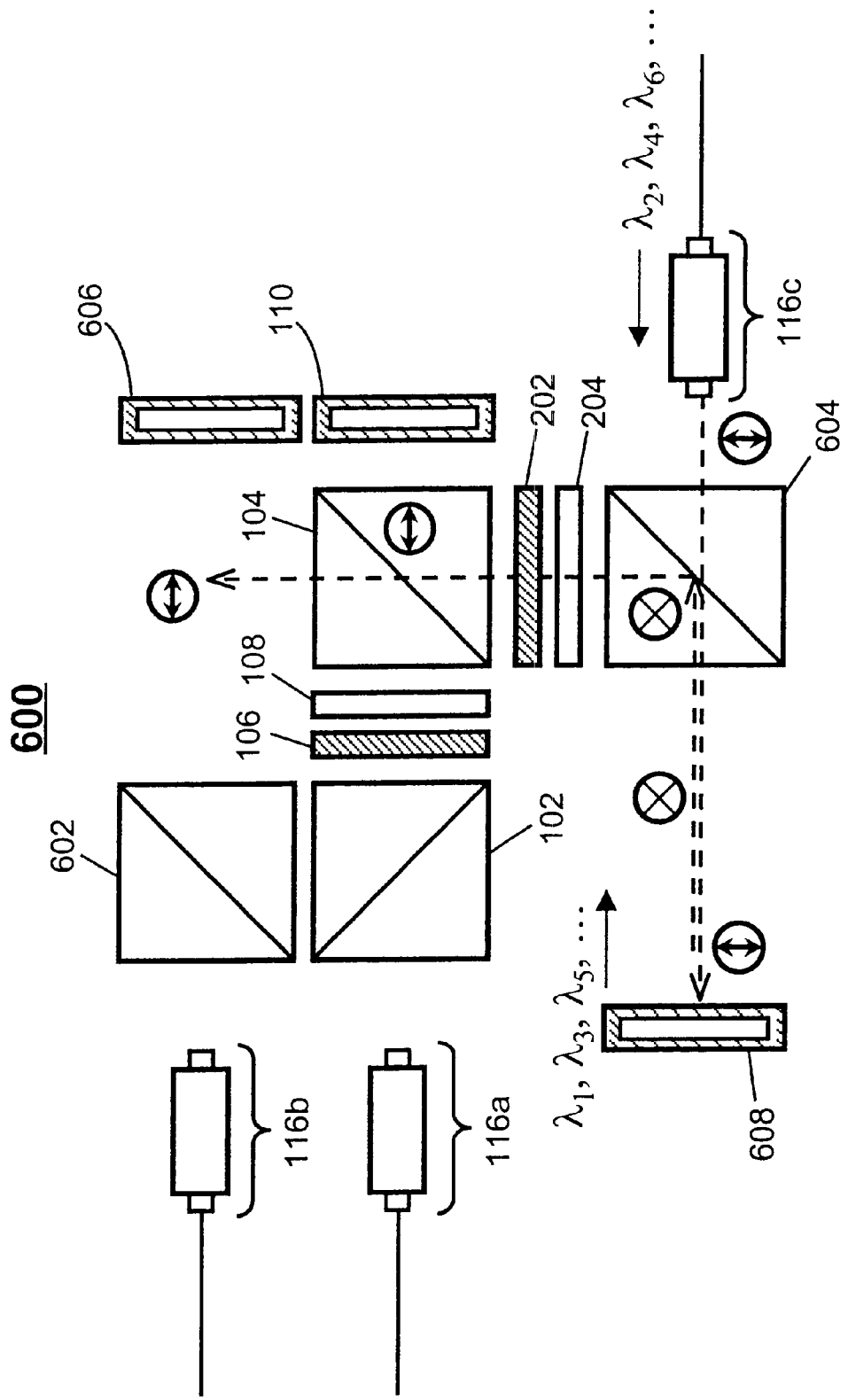
Figure 6E:
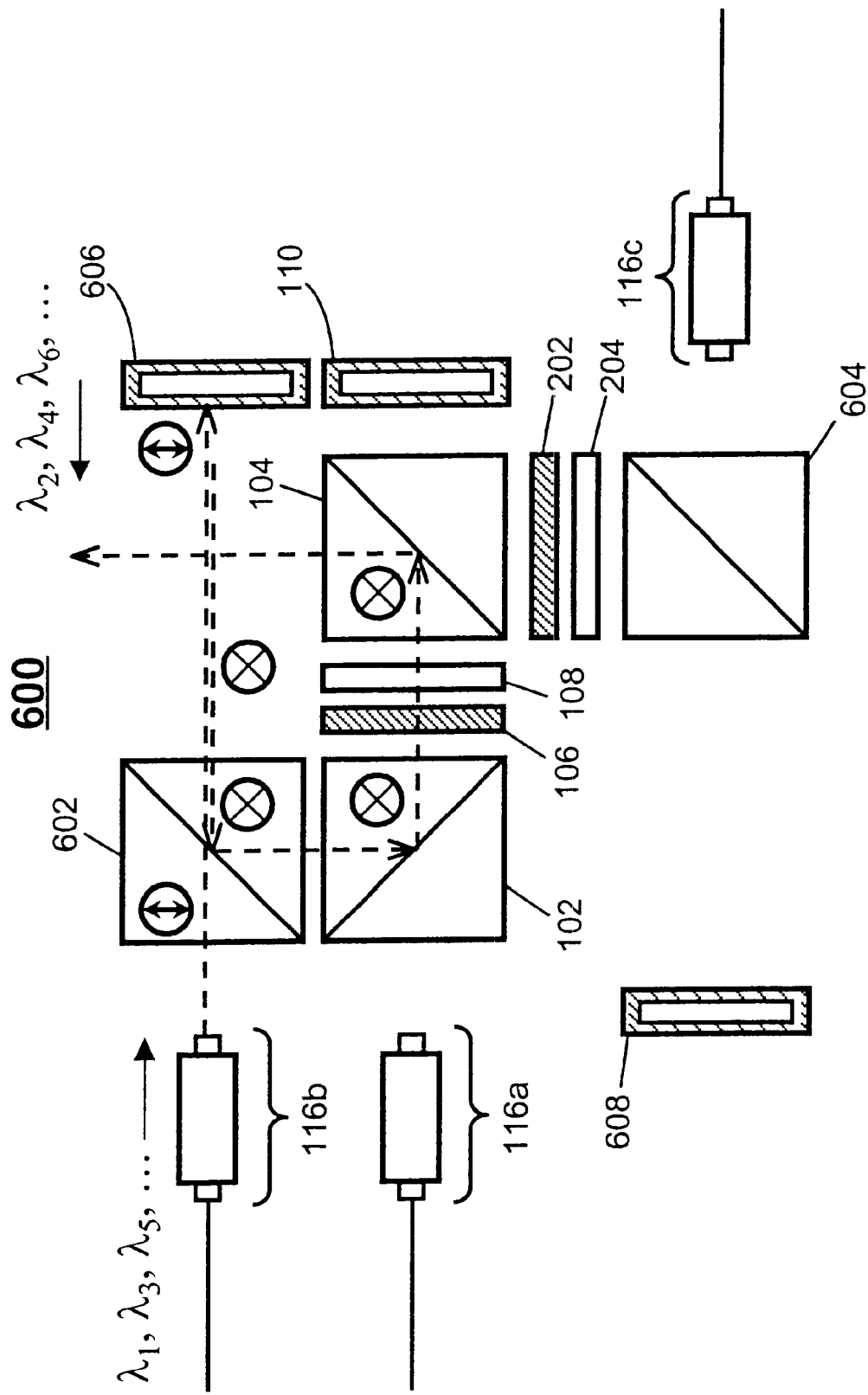
Figure 6F:
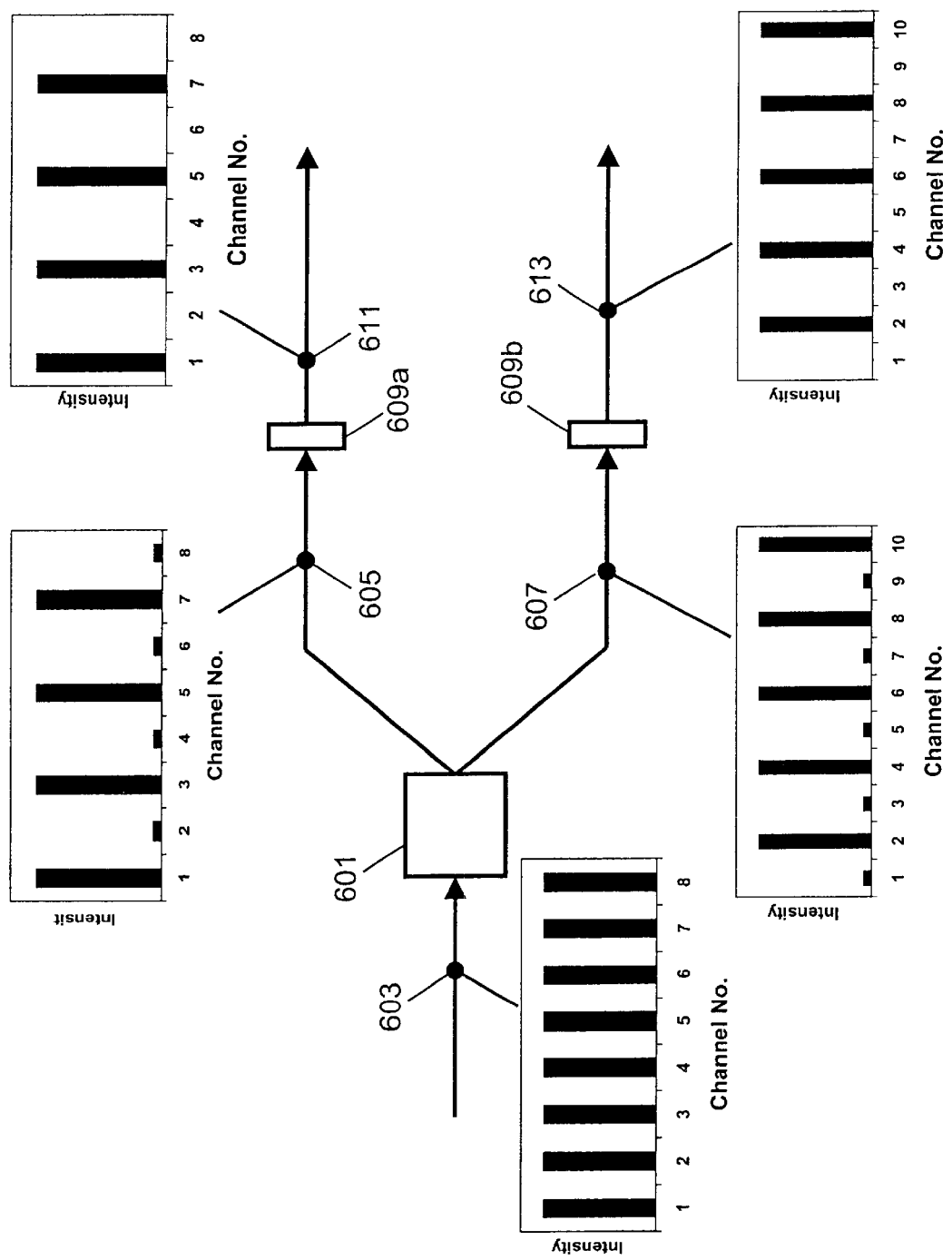

FIG. 6f shows a schematic representation of optical channels as they are transmitted through the channel separator stage supplemented by the channel comb filter stage of the seventh preferred embodiment of the multi-functional separator in accordance with the present invention. The channel separator stage 601 initially separates an initial optical input signal 603, comprised of a plurality of optical channels, into two signals each comprising a subset of the channels—a first signal subset 605 comprised primarily of "odd" channels and a second subset 607 comprised primarily of "even" channels, respectively. Histograms attached to each signal and signal subset represent, hypothetically, the intensities of the channels comprising each such signal. If the channel separator 601 is perfect then the signal 605 is comprised only of odd channels and the signal 607 is comprised only of even channels. However, since, in general, the separator 601 is not perfect, there is some "leakage" of even channels into signal 605 and of some odd channels into signal 607.

As shown in FIG. 6f, to increase the degree of isolation of the odd channel signal 605 from the even channels and of the even channel signal 607 from the odd channels, two optical channel comb filters, 609A and 609B, respectively, are incorporated into the apparatus. The first optical channel comb filter 609A (second optical channel comb filter 609B) is designed so as to transmit a high proportion of the intensity of the odd (even) channels and a negligible proportion of the intensity of the even (odd) channels. Taken together, the channel separator and each of the dense optical channel comb filters provides an acceptable level of isolation of the resulting odd channel and even channel signals, 611 and 613, respectively.

Returning to FIG. 6a, this drawing shows the pathways and polarization states of channels input to the channel separator 600 between the input port 116a and the non-linear interferometer 110. This portion of the pathway of each channel through the channel separator 600 is referred to herein as the forward pathway. These forward pathways illustrated in FIG. 6a are identical to those shown for the channel separator 100 in FIG. 1a and are not re-described.

FIG. 6b illustrates the pathways of the set of odd channels $\lambda_1, \lambda_3, \lambda_5, \ldots$ through the seventh preferred embodiment of the multi-functional separator in accordance with the present invention, after interacting with and being reflected by the non-linear interferometer 110. The odd channels are reflected from the non-linear interferometer without polarization plane rotation and therefore the light comprising these channels remains p-polarized with respect to the second PBS 104. If the non-linear interferometer 110 does not operate perfectly, however, then a small, unwanted proportion of the light comprising the even channels may also be reflected therefrom as similarly p-polarized light. This p-polarized light comprising the odd channels (and possibly a small proportion of the even channels) passes directly through PBS 104 towards and through the reciprocal optical rotator 108 and the non-reciprocal optical rotator 106. Upon passing through the pair of elements 106–108 from right to left as shown in FIG. 6b, the light comprising the odd channels (and possibly a small proportion of the even channels) experiences a 90° rotation of the orientation of its polarization plane and therefore is transformed to light of s-polarization with respect to the first PBS 102 and the third PBS 602. As shown in FIG. 6b, the PBS 102 reflects this s-polarized light towards the third PBS 602 and, subsequently, the third PBS 602 reflects this light towards the second non-linear interferometer 606.

FIG. 6c illustrates the pathways of the set of even channels $\lambda_2, \lambda_4, \lambda_6, \ldots$ through the seventh preferred embodiment of the multi-functional separator in accordance with the present invention, after interacting with and being reflected by the non-linear interferometer 110. Upon reflection from the non-linear interferometer 110, the light of the even channels incurs a 90° rotation of its polarization plane. Therefore the light comprising these even channels becomes s-polarized with respect to the second PBS 104. If the non-linear interferometer 110 does not operate perfectly, however, then a small, unwanted proportion of the light comprising the odd channels may also be reflected therefrom as similarly s-polarized light. This s-polarized light comprising the even channels (and possibly a small proportion of the odd channels) is reflected by PBS 104 towards and through the non-reciprocal optical rotator 202 and the reciprocal optical rotator 204 to the fourth PBS 604. Upon passing through the pair of elements 202–204 from top to bottom as shown in FIG. 6c, this light does not incur polarization rotation and therefore remains s-polarized with respect to the fourth PBS 604. As shown in FIG. 6c, the fourth PBS 604 reflects this s-polarized light comprising the even channels (and possibly a small proportion of the odd channels) towards the third non-linear interferometer 608.

The interaction of optical signals with either the second non-linear interferometer 606 or the third non-linear interferometer 608 together with the subsequent signal pathways comprises the comb filter stage of operation of the separator/isolator/comb filter 600. The nominal pathway of the odd channels in the comb filter stage is illustrated in FIG. 6b. As shown in FIG. 6b, the odd channels are reflected by the third PBS 602 with s-polarization and are thence directed to and reflected by the second non-linear interferometer 606. The non-linear interferometer 606 is configured such that odd channels reflected therefrom incur a 90° rotation of their polarization plane orientation. Thus, the polarization of the light of the odd channels reflected from non-linear interferometer 606 is transformed to p-polarization with respect to PBS 602. This p-polarized light comprising the odd channels $\lambda_1, \lambda_3, \lambda_5, \ldots$ is thenceforth transmitted directly through PBS 602 towards and into the second port 116b.

Similarly, the nominal pathway of the even channels in the comb filter stage is illustrated in FIG. 6c. As shown in FIG. 6c, the even channels are reflected by the fourth PBS 604 with s-polarization and are thence directed to and reflected by the third non-linear interferometer 608. The non-linear interferometer 608 is configured such that even channels reflected therefrom incur a 90° rotation of their polarization plane orientation. Thus, the polarization of the light of the even channels reflected from non-linear interferometer 608 is transformed to p-polarization with respect to PBS 604. This p-polarized light comprising the even channels $\lambda_2, \lambda_4, \lambda_6, \ldots$ is thenceforth transmitted directly through PBS 604 towards and into the third port 116c.

FIGS. 6d and 6e illustrate the pathways through the seventh preferred embodiment of the multi-functional separator in accordance with the present invention of inadvertently reflected signal light rays and of the small proportion of signal light rays misdirected in the first channel separation stage. FIG. 6d shows the pathways for inadvertently reflected even channels and for mis-directed odd channels. The inadvertently reflected even channels are input to the channel separator 600 from the third port 116c and are directed towards and through the fourth PBS 604 as p-polarized light rays. Simultaneously, the small, unwanted proportion of odd channels that are mis-directed towards non-linear interferometer 608 in the first (separation) stage comprise s-polarized signal light rays. The p-polarized light rays comprising the even channels are reflected by non-linear interferometer 608 with a 90°-polarization rotation and the s-polarized light rays comprising the odd channels are reflected by non-linear interferometer 608 without polarization rotation. Therefore, both such sets of light rays are reflected from non-linear interferometer 608 as s-polarized rays. The PBS 604 reflects these s-polarized rays towards and through the reciprocal optical rotator 204 and the non-reciprocal optical rotator 202. Upon passing through the pair of components 202–204 from bottom to top as illustrated in FIG. 6d, the polarization orientation of the reflected and mis-directed signal light rays is rotated by 90° so as to be transformed into p-polarization with respect to the second PBS 104. These p-polarized light rays, comprising unwanted reflected even channels and mis-directed odd channels, then pass directly through PBS 104 so as to exit the channel separator 600 without being directed towards any port.

FIG. 6e shows signal light pathways through the comb filtering stage of apparatus 600 for inadvertently reflected odd channels and for mis-directed even channels. The inadvertently reflected odd channels are input to the channel separator 600 from the second port 116b and are directed towards and through the third PBS 602 as p-polarized light rays. Simultaneously, the small, unwanted proportion of even channels that are mis-directed towards non-linear interferometer 606 in the first (separation) stage comprise s-polarized signal light rays. The p-polarized light rays comprising the odd channels are reflected by non-linear interferometer 606 with a 90°-polarization rotation and the s-polarized light rays comprising the even channels are reflected by non-linear interferometer 608 without polarization rotation. Therefore, both such sets of light rays are reflected from non-linear interferometer 606 as s-polarized rays. The PBS 602 reflects these s-polarized rays towards the first PBS 102 which again reflects them towards and through the non-reciprocal optical rotator 106 and the reciprocal optical rotator 108. Upon passing through the pair of components 106–108 from left to right as illustrated in FIG. 6e, the polarization orientation of the reflected and mis-directed signal light rays remains s-polarized with respect to the second PBS 104. These s-polarized light rays, comprising unwanted reflected odd channels and mis-directed even channels, are then reflected by PBS 104 so as to exit the apparatus 600 without being directed towards any port.

Figure 6G:
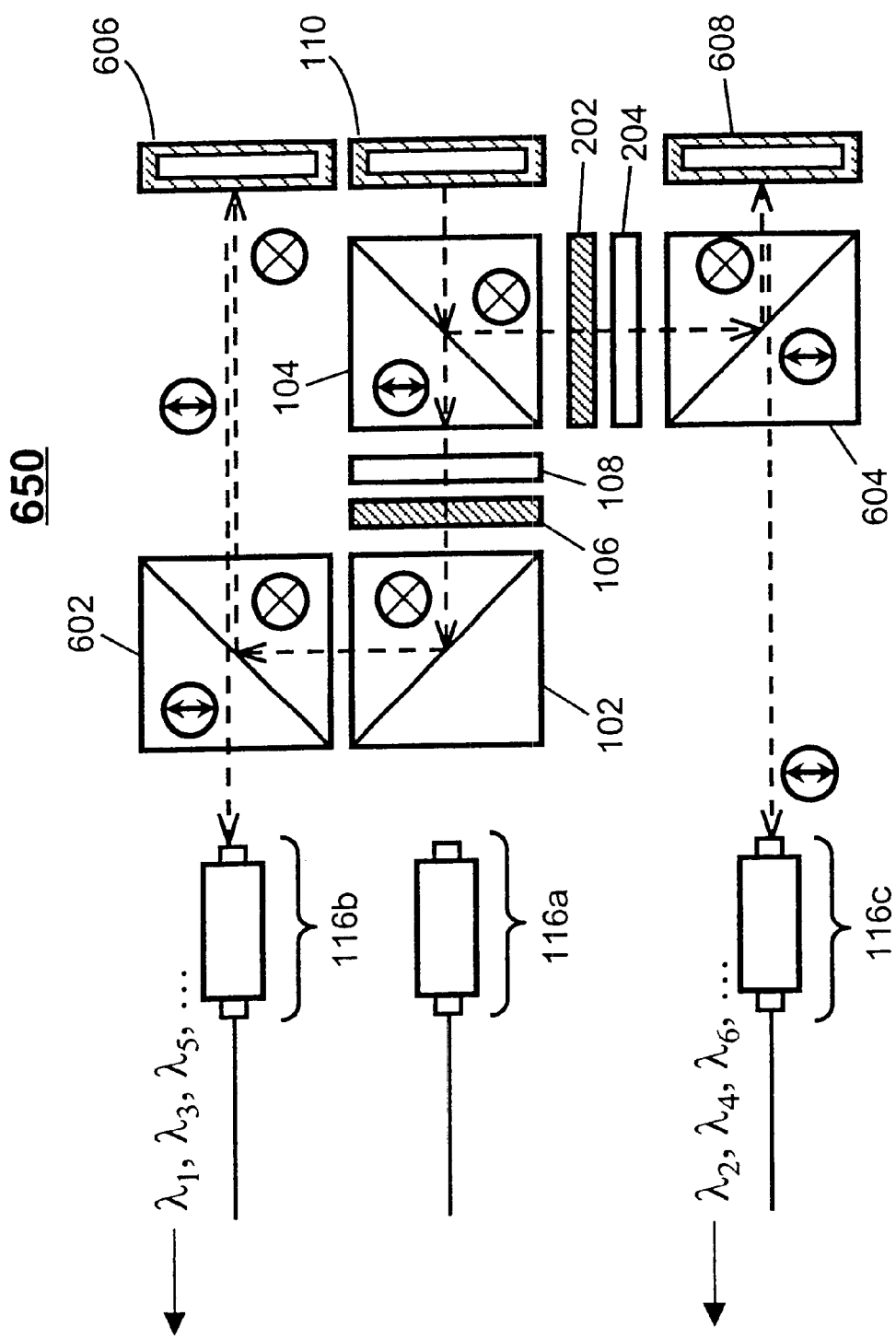
FIG. 6g illustrates a side view of an eighth preferred embodiment of a multi-functional separator in accordance with the present invention.

FIG. 6g illustrates a side view of an eighth preferred embodiment of a multi-functional separator in accordance with the present invention. The eighth preferred embodiment provides a 1×2 dense wavelength division de-multiplexer, an optical comb filter and optical isolator. The channel separator 650 (FIG. 6g) is constructed and operates similarly to the channel separator 600 (FIGS. 6a–6e) except that the PBS 604 is rotated about a vertical axis and the locations of the non-linear interferometer 608 and the output port 116c are reversed with respect to the PBS 604. Other aspects of the operation of channel separator 650 are similar to those of channel separator 600 and are not repeated. Many other similar modifications, in which one or more components are simply inverted, rotated or interchanged, would be readily apparent to one of ordinary skill in the art. All such modifications to any of the described embodiments of the present invention are considered to be within the spirit and scope of the present invention.

Figure 6H:
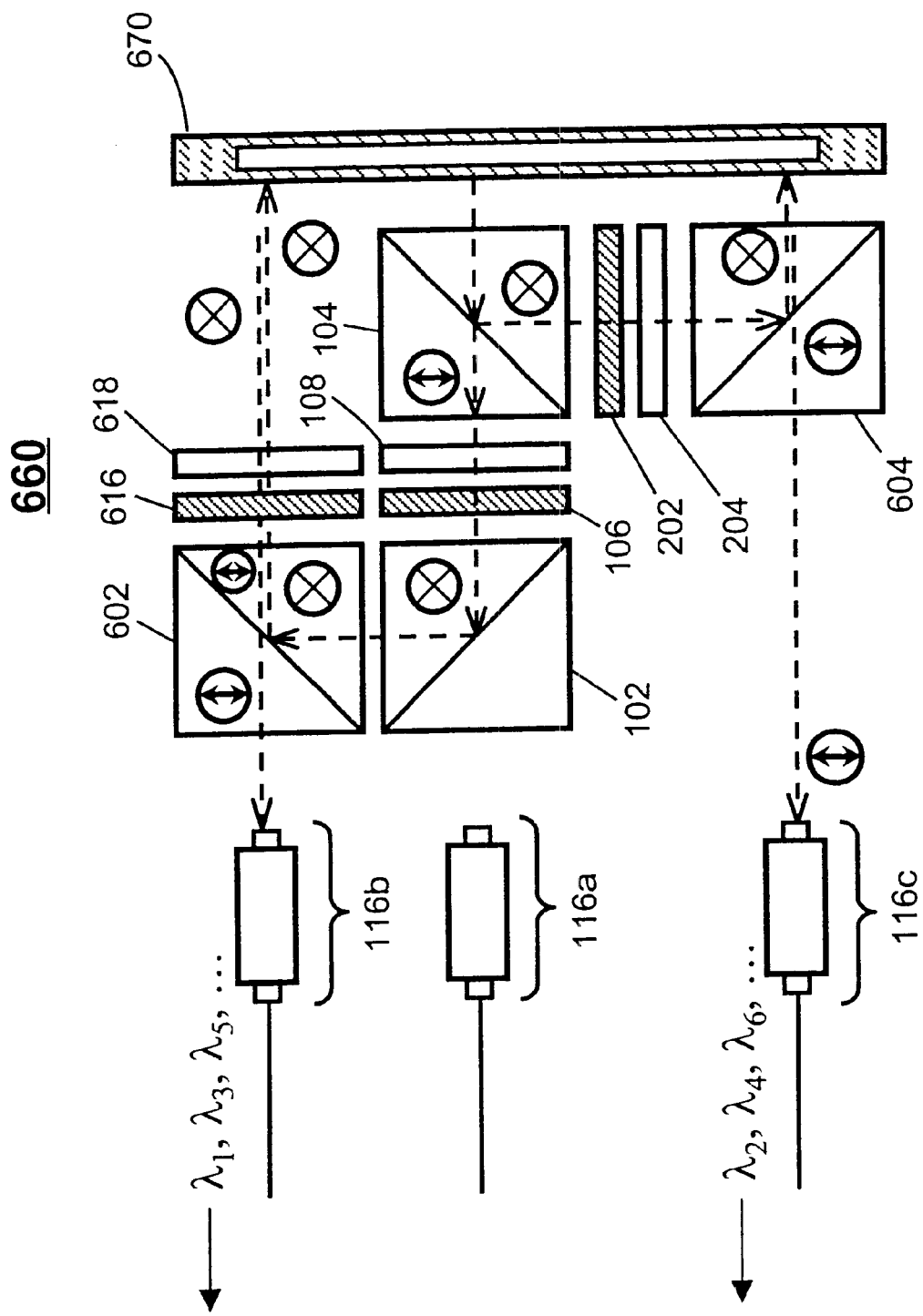
FIG. 6h illustrates a side view of a ninth preferred embodiment of a multi-functional separator in accordance with the present invention.

FIG. 6h illustrates a side view of a ninth preferred embodiment of a multi-functional separator in accordance with the present invention. The ninth preferred embodiment provides a 1×2 dense wavelength division de-multiplexer, an optical comb filter and optical isolator. The channel separator 660 (FIG. 6h) is constructed similarly to the channel separator 650 (FIG. 6g) except that the first 110, second 606 and third 608 non-linear interferometers are all replaced by a single elongated non-linear interferometer 670 and an additional non-reciprocal optical rotator 616 and an additional reciprocal optical rotator 618 are disposed between the third PBS 602 and the non-linear interferometer 670. The optical rotators 616–618 are configured such that the polarization plane of linearly polarized light passing through both rotators from left to right is not rotated whilst that of linearly polarized light passing therethrough from right to left incurs a 90° rotation. Alternatively, instead of providing the optical rotators 616–618, the optical rotators 106–108 could be elongated so as to cover the space adjacent to the third PBS 602. By tracing through the pathways and polarization orientations of signal light rays through the channel separator 660 in FIG. 6h, it may be verified that the channel separator 660 operates as a wavelength division de-multiplexer, an optical comb filter and an optical isolator.

FIGS. 7a–7e illustrate a tenth preferred embodiment of a multi-functional separator in accordance with the present invention. The tenth preferred embodiment provides a 1×4 dense wavelength division de-multiplexer. In the channel separator 700 (FIG. 7a), an input set of wavelength division multiplexed channels $\lambda_1$–$\lambda_n$ is divided into two channel subsets in a first internal channel separation stage and each such subset is further divided into two smaller subsets in a subsequent second stage. Each of the four channel subsets resulting from the sequentially arranged two divisions is then output to a different respective output port.

In the channel separator 700 (FIG. 7a), the three ports 116a–116c, the first PBS 102, the second PBS 104, the third PBS 602, the fourth PBS 604, the first non-linear interferometer 110, the first non-reciprocal optical rotator 106 and the first reciprocal optical rotator 108 are common to and are disposed similarly to the respective similarly numbered components comprising the channel separator 600 (FIG. 6a). The common components comprise the first separation stage components of channel separator 700. Further, the channel separator 700 (FIG. 7a) comprises an additional two output ports 116d–116e, a second non-linear interferometer 706, a third non-linear interferometer 708, a fifth PBS 702, a sixth PBS 710, a first optical reflector 704, a second optical reflector 712, a second non-reciprocal optical rotator 714, a second reciprocal optical rotator 716, a third non-reciprocal optical rotator 718, and a third reciprocal optical rotator 720. These additional components are disposed within the channel separator 700 as illustrated in FIGS. 7a–7e.

In the channel separator 700, each of the second 706 and third 708 non-linear interferometers comprises a periodicity—that is, a wavelength difference at which the properties of light reflected from the interferometer are repeated—that is double that of first non-linear interferometer 110. The second 706 and the third 708 non-linear interferometers that comprise channel separator 700 are disposed similarly to the non-linear interferometers 606–608 of channel separator 600 with respect to the common first-separation-stage components.

Also, in the channel separator 700, the fifth PBS 702 is interposed between the third PBS 602 and the second non-linear interferometer 706 whilst the second non-reciprocal optical rotator 714 and the second reciprocal optical rotator 716 are optically coupled to and interposed between the PBS 602 and the PBS 702. Likewise, the sixth PBS 710 is interposed between the fourth PBS 604 and the third non-linear interferometer 708 whilst the third non-reciprocal optical rotator 718 and the third reciprocal optical rotator 720 are optically coupled to and interposed between the PBS 604 and the PBS 710. The first optical reflector 704 is disposed so as to receive light reflected by fifth PBS 702 and reflect it towards the fourth port 116d. The second optical reflector 712 is disposed so as to receive light reflected by sixth PBS 710 and reflect it towards the fifth port 116e.

The mutually adjacent optical rotators 714–716 comprising channel separator 700 (FIG. 7a) are disposed such that polarized light passing through both elements from left to right incurs a 90° polarization plane rotation whilst polarized light passing through both elements from right to left does not incur any polarization plane rotation. Note that this is opposite to the behavior of polarized light passing through the pair of optical rotators 106–108. Also, the mutually adjacent optical rotators 718–720 are disposed such that polarized light passing through both elements from right to left incurs a 90° polarization plane rotation whilst polarized light passing through both elements from left to right does not incur any polarization plane rotation.

Figure 7B:
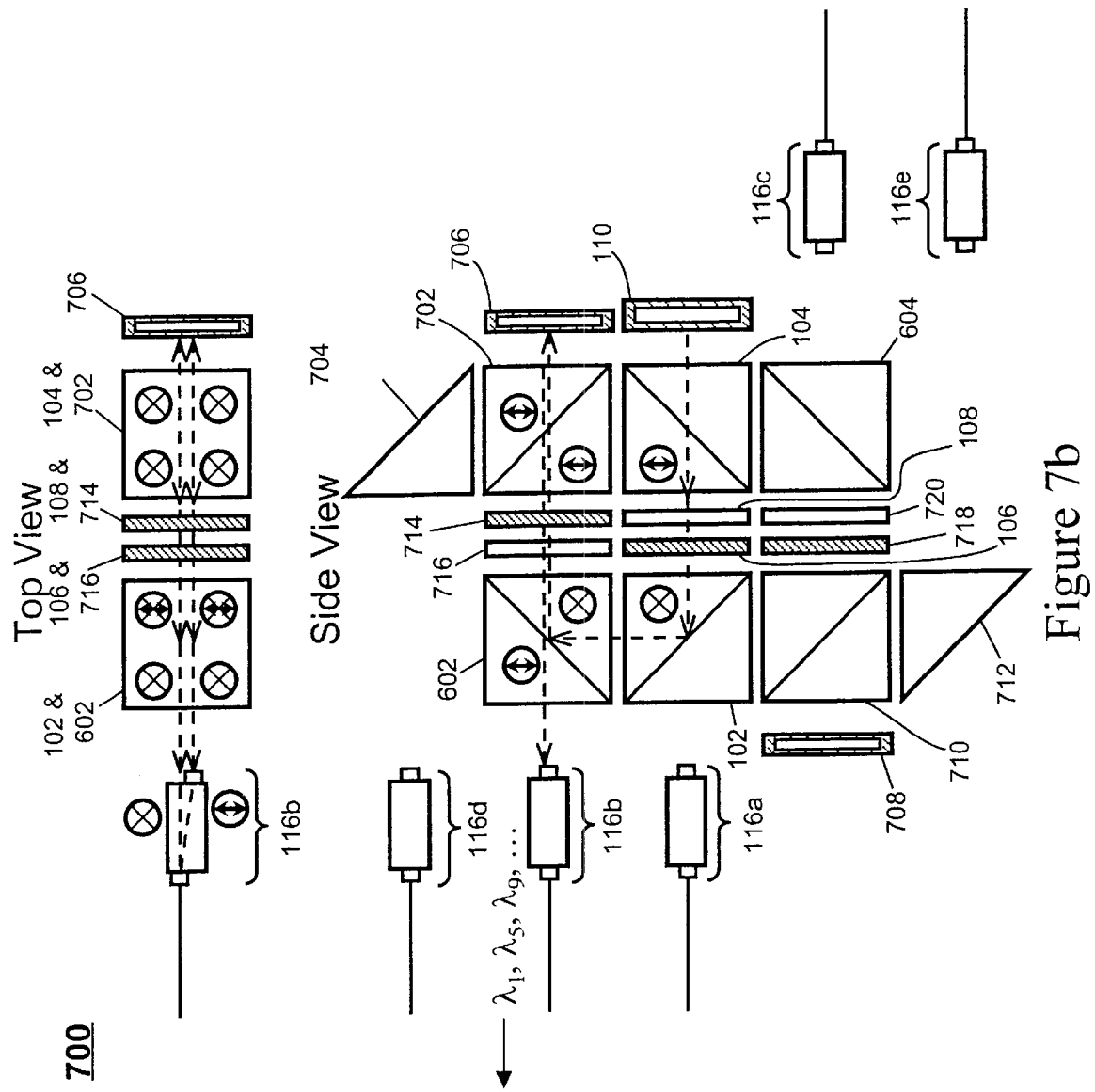
Figure 7C:
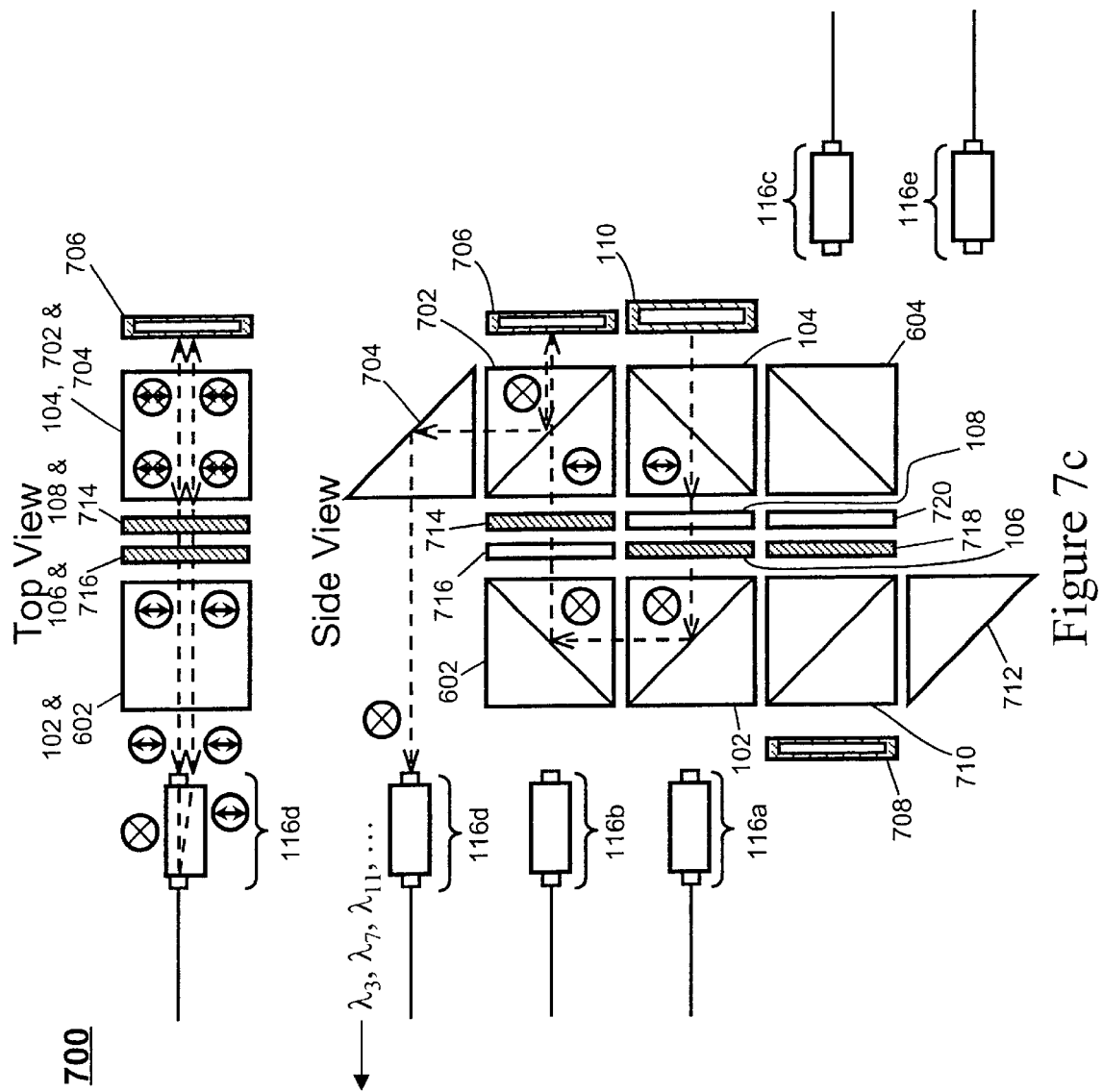

FIGS. 7b–7c illustrate the pathways of the odd channels $\lambda_1, \lambda_3, \lambda_5, \ldots$ through the tenth preferred embodiment of a multi-functional separator in accordance with the present invention, after interaction with and reflection by the first non-linear interferometer 110 and also illustrate the subsequent division of the odd channels into a first subset $\lambda_1, \lambda_5, \lambda_9, \ldots$ of the odd channels and a second subset $\lambda_3, \lambda_7, \lambda_{11}, \ldots$ of the odd channels. The pathways of the odd channels from the first non-linear interferometer 110 to the third PBS 602 comprise a portion of the first channel separation stage and are similar to those illustrated for separator 600 in FIG. 6b. These pathways are therefore not re-described. After reflection from the third PBS 602 (FIGS. 7b–7c), the s-polarized light of the odd channels is directed towards and through the second reciprocal optical rotator 716 and the second non-reciprocal optical rotator 714 and thence to the fifth PBS 702. Because the light passes through the pair of rotators 714–716 from left to right, the polarization of this light is rotated by 90° so as to be transformed to p-polarized light with respect to the fifth PBS 702. As shown in both FIG. 7b and FIG. 7c, the p-polarized odd channels thence pass straight through the PBS 702 so as to interact with and be reflected by the second non-linear interferometer 706.

The non-linear interferometer 706 has the property of reflecting the linearly polarized light of the odd channels input thereto such that the first set of odd channels $\lambda_1, \lambda_5, \lambda_9$, . . . is reflected without polarization plane rotation (FIG. 7b) whilst the second set of odd channels $\lambda_3, \lambda_7, \lambda_{11}$, . . . is reflected with a 90° polarization-plane rotation (FIG. 7c). Therefore, upon reflection from non-linear interferometer 706, the first set $\lambda_1, \lambda_5, \lambda_9$, . . . of odd channels remains p-polarized with respect to PBS 702 and passes straight through PBS 702 towards and through the second non-reciprocal optical rotator 714 and the second reciprocal optical rotator 716 (FIG. 7b) whilst the second set $\lambda_3, \lambda_7, \lambda_{11}$, . . . of odd channels is s-polarized with respect to PBS 702 and is reflected by PBS 702 towards the first optical reflector 704 (FIG. 7c). Because the first set of odd channels $\lambda_1, \lambda_5, \lambda_9$, . . . passes through the pair of rotators 714–716 from right to left, the light of these channels remains p-polarized with respect to PBS 602 and therefore passes straight through PBS 602 towards and into the second port 116b (FIG. 7b). The second set of odd channels $\lambda_3, \lambda_7, \lambda_{11}$, . . . is reflected by reflector 704 towards and into the fourth port 116d (FIG. 7c). In this fashion, the outputs of the first and second sets of odd channels are separated from one another as well as from those of the even channels.

Figure 7D:
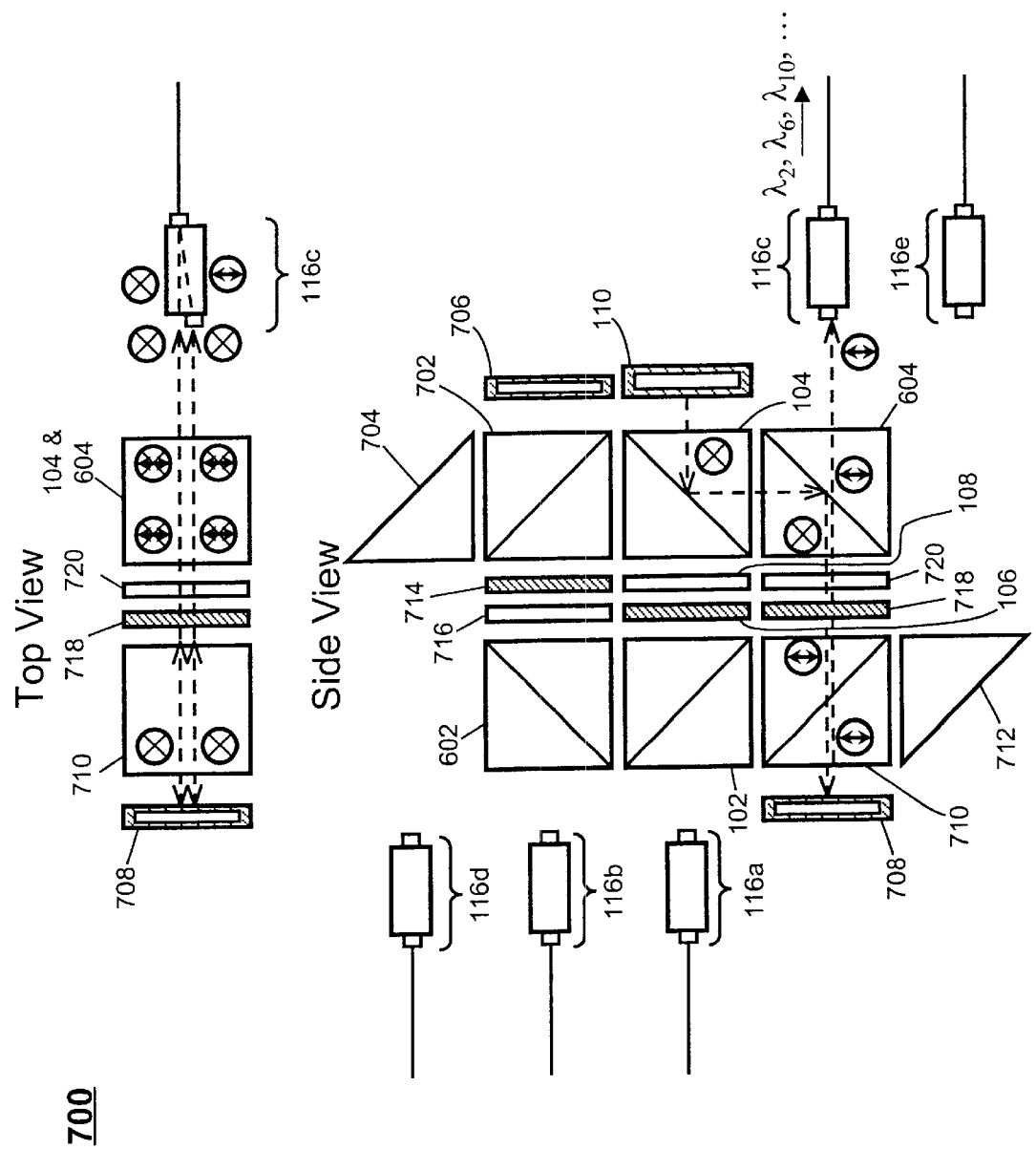
Figure 7E:
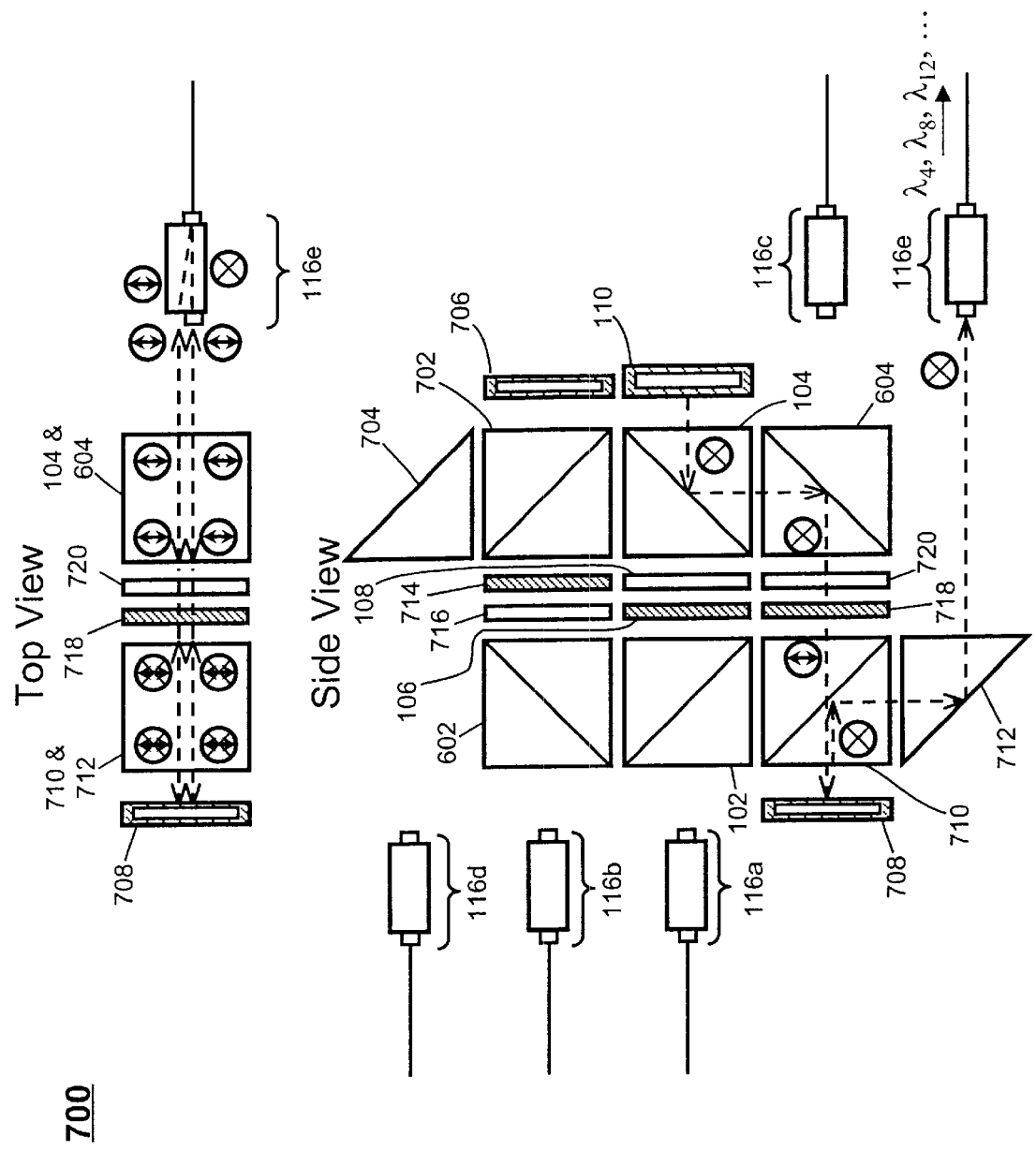

FIGS. 7d–7e illustrate the pathways of the even channels $\lambda_2, \lambda_4, \lambda_6$, . . . through the tenth preferred embodiment of a multi-functional separator in accordance with the present invention, after interaction with and reflection by the first non-linear interferometer 110. FIGS. 7d–7e also illustrate the subsequent division of the even channels into a first subset $\lambda_2, \lambda_6, \lambda_{10}$, . . . of the even channels and a second subset $\lambda_4, \lambda_8, \lambda_{12}$, . . . of the even channels, respectively. The pathways of the even channels from the first non-linear interferometer 110 to the fourth PBS 604 comprise a portion of the first channel separation stage and are similar to those illustrated for separator 600 in FIG. 6c. These pathways are therefore not re-described. After reflection from the fourth PBS 604 (FIGS. 7d–7e), the s-polarized light of the odd channels is directed towards and through the third reciprocal optical rotator 720 and the third non-reciprocal optical rotator 718 and thence to the sixth PBS 710. Because the light passes through the pair of rotators 718–720 from right to left, the polarization of this light is rotated by 90° so as to be transformed to p-polarized light with respect to the sixth PBS 710. As shown in both FIG. 7d and FIG. 7e, the p-polarized even channels thence pass straight through the PBS 710 so as to interact with and be reflected by the third non-linear interferometer 708.

The non-linear interferometer 708 has the property of reflecting the linearly polarized light of the even channels input thereto such that the first set of even channels $\lambda_2, \lambda_6, \lambda_{10}$, . . . is reflected without polarization plane rotation (FIG. 7d) whilst the second set of even channels $\lambda_4, \lambda_8, \lambda_{12}$, . . . is reflected with a 90° polarization-plane rotation (FIG. 7e).

Therefore, upon reflection from non-linear interferometer 708, the first set $\lambda_2, \lambda_6, \lambda_{10}$, . . . of even channels remains p-polarized with respect to PBS 710 and passes straight through PBS 710 towards and through the third non-reciprocal optical rotator 718 and the third reciprocal optical rotator 720 (FIG. 7d) whilst the second set $\lambda_4, \lambda_8, \lambda_{12}$, . . . of even channels is s-polarized with respect to PBS 710 and is reflected by PBS 710 towards the second reflector 712 (FIG. 7e). Because the first set of even channels $\lambda_2, \lambda_6, \lambda_{10}$, . . . passes through the pair of rotators 718–720 from left to right, the light of these channels remains p-polarized with respect to PBS 604 and therefore passes straight through PBS 604 towards and into the third port 116c (FIG. 7d). The second set of even channels $\lambda_4, \lambda_8, \lambda_{12}$, . . . is reflected by reflector 712 towards and into the fifth port 116e (FIG. 7e). In this fashion, the outputs of the first and second sets of even channels are separated from one another as well as from those of the odd channels. From the foregoing discussions, it is apparent that the separator 700 receives, from a first port, a wavelength division multiplexed light comprised of a plurality of n channels $\lambda_1$–$\lambda_n$ and separates the plurality into four subsets of channels, each of which subsets are output from a respective one of a set of four output ports. In this fashion, the separator 700 functions as a 1×4 de-multiplexer.

Figure 7F:
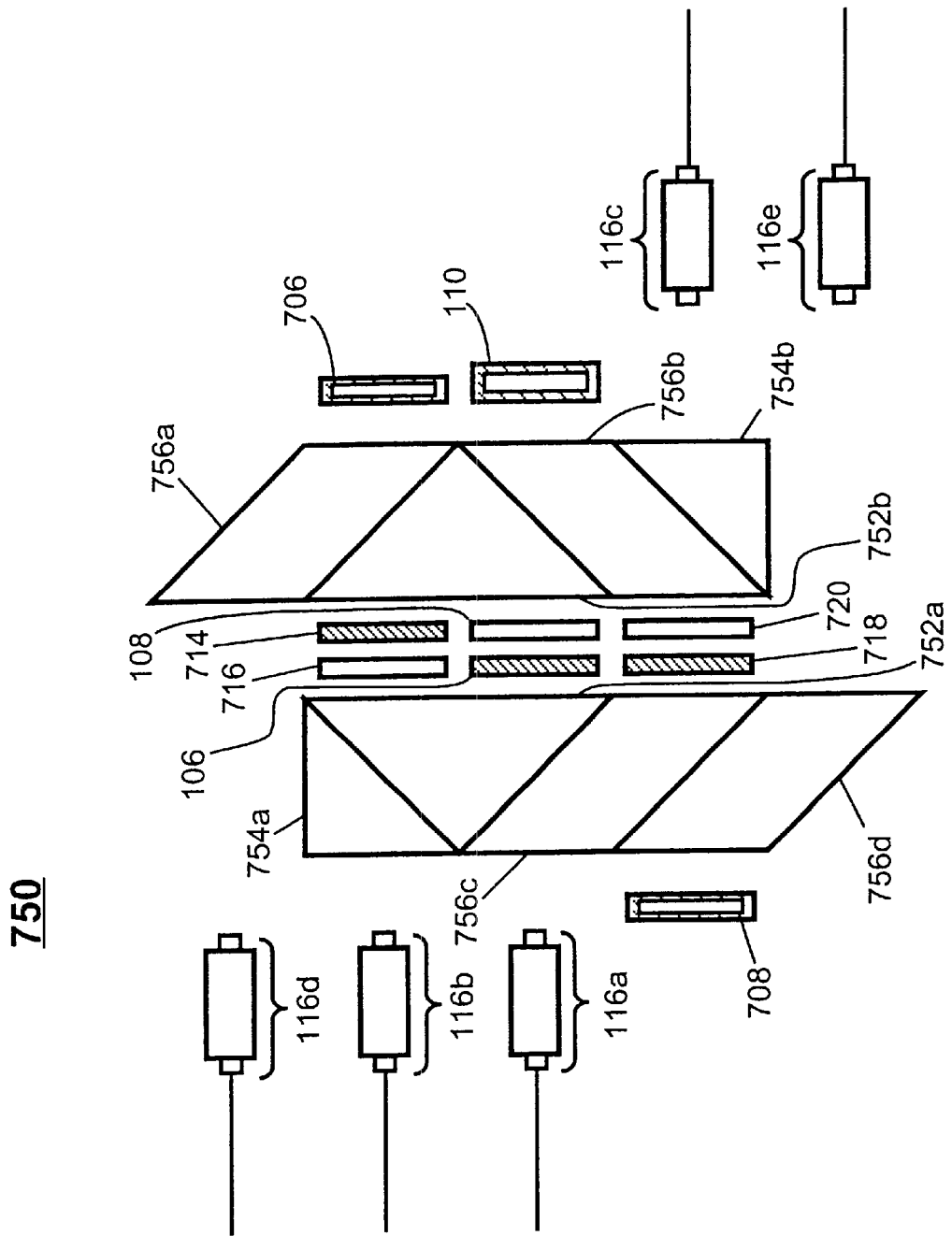
FIG. 7f presents a side view of an eleventh preferred embodiment of a multi-functional separator in accordance with the present invention.

FIG. 7f presents a side view of an eleventh preferred embodiment of a multi-functional separator in accordance with the present invention. The eleventh preferred embodiment also provides a 1×4 dense wavelength division de-multiplexer. The separator 750 (FIG. 7f) comprises identical functionality to and many of the same components as the separator 700 (FIGS. 7a–7e) except that the six polarization beam splitters 102, 104, 602, 604, 702, 710 and the two optical reflectors 704, 712 are all replaced by a set of prisms. The prisms within the separator 750 comprise two larger right-angle prisms 752a–752b, a pair of smaller right-angle prisms 754a–754b, and four rhomboid prisms 756a–756d, all disposed as shown in FIG. 7f. The "slanted" surfaces of the prisms are configured so as to reflect s-polarized light and transmit p-polarized light as previously indicated for polarization beam splitters in other embodiments of the present invention. Thus, the separator 750 operates similarly to the separator 700.

Figure 8:
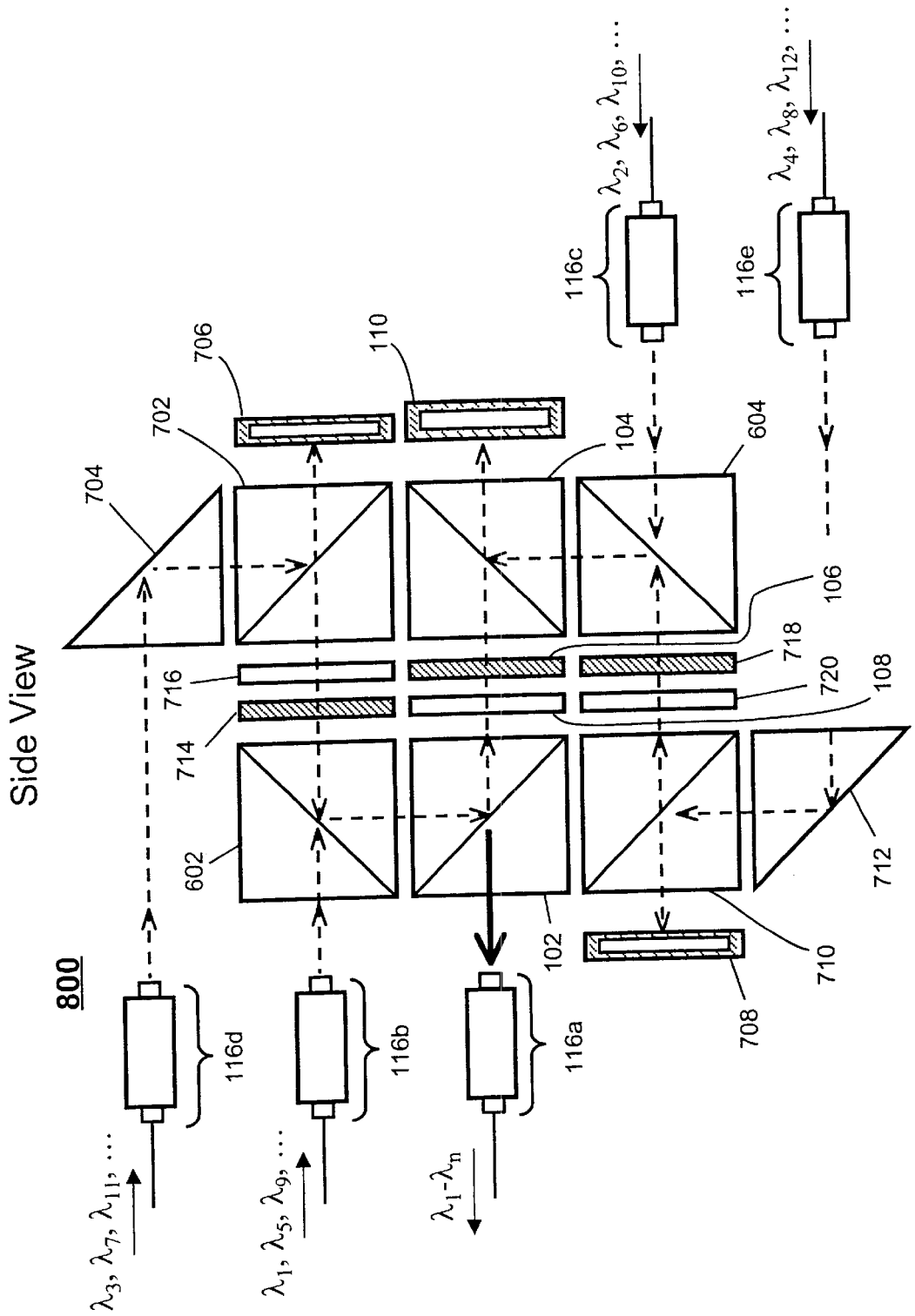
FIG. 8 illustrates a twelfth preferred embodiment of a multi-functional separator in accordance with the present invention.

Finally, FIG. 8 illustrates a twelfth preferred embodiment of a multi-functional separator in accordance with the present invention. The twelfth preferred embodiment provides a 4×1 dense wavelength division multiplexer. The 4×1 multiplexer 800 (FIG. 8) is identical in construction to the 1×4 de-multiplexer 700 (FIGS. 7a–7e) except that, as previously described in reference to the multiplexer 400, each adjacent pair of optical rotators functions in the reverse sense from the corresponding pair of rotators in the de-multiplexer 700. Therefore, in the multiplexer 800 (FIG. 8), the pathways of signal light rays are exactly reversed from those in the de-multiplexer 700 (FIGS. 7a–7e). As shown in FIG. 8, in the multiplexer 800, the channels $\lambda_1, \lambda_5, \lambda_9$, . . . input from port 116b are combined together with the channels $\lambda_2, \lambda_6, \lambda_{10}$, . . . input from port 116c, the channels $\lambda_3, \lambda_7, \lambda_{11}$, . . . input from port 116d and the channels $\lambda_4, \lambda_8, \lambda_{12}$, . . . input from port 116e such that the combined channels $\lambda_1$–$\lambda_n$ are all output from the port 116a.

A multi-functional channel separator and channel combiner has been disclosed. The channel separator in accordance with the present invention is capable of functioning as a dense wavelength division demultiplexer or multiplexer. In the preferred embodiment, the channel separator comprises a polarizing input port, two polarizing output ports, a reflective non-linear interferometer, a pair of polarization beam splitters, and a non-reciprocal optical rotator and a reciprocal optical rotator, wherein the two optical rotators are disposed adjacent to one another and interposed between the two polarization beam splitters. Each of the polarizing input and polarizing output ports comprises an optical fiber, a collimator, a birefringent walk-off plate and a non-reciprocal optical rotator. The channel separator is easily aligned by adjusting the positions of each of the polarizing input and output ports. Further embodiments of the present invention provide additional optical isolation, optical circulation, optical comb filtering and/or two-stage channel separation capabilities.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical device, comprising:
   a first polarization beam splitter (PBS);
   a first set of optical rotators optically coupled to the first PBS at a face intersecting a main axis of the device, the first set of optical rotators comprising a first non-reciprocal optical rotator (NRR) and a first reciprocal optical rotator (RR);
   a second PBS optically coupled to the first set of optical rotators at a side opposite to the first PBS; and
   a first reflective non-linear interferometer (NLI) optically coupled to the second PBS at a side opposite to the first set of rotators for reflecting a linearly polarized light comprising a first set of channels and a second set of channels, wherein the first set of channels is reflected without a polarization plane rotation, wherein the second set of channels is reflected with a polarization plate rotation.

2. The device of claim 1, wherein the first NRR is optically coupled to the first PBS at the face intersecting the main axis and the first RR is optically coupled to the first NRR at a side opposite to the first PBS.

3. The device of claim 1, further comprising:
   a first optical port optically coupled to the first PBS at a side opposite to the first set of optical rotators.

4. The device of claim 3, wherein the first port comprises:
   an optical collimator;
   a birefringent walk-off plate optically coupled to the optical collimator; and
   an input reciprocal optical rotator intercepting a portion of a light from the birefringent walk-off plate.

5. The device of claim 1, further comprising:
   a second set of optical rotators optically coupled to the second PBS at a face of the second PBS that is not intersecting the main axis, the second set of optical rotators comprising a second NRR and a second RR;
   a third PBS optically coupled to the first PBS at a face of the first PBS that is not intersecting the main axis; and
   a fourth PBS optically coupled to the second set of optical rotators at a side opposite to the second PBS.

6. The device of claim 5, further comprising:
   a second reflective NLI optically coupled to the third PBS; and
   a third reflective NLI optically coupled to the fourth PBS.

7. A composite optical signal demultiplexer (DEMUX), comprising:
   a first PBS;
   a NRR optically coupled to the first PBS at a face intersecting a main axis of the DEMUX;
   a RR optically coupled to the NRR at a side opposite to the first PBS;
   a second PBS optically coupled to the RR at a side opposite to the NRR; and
   a reflective NLI optically coupled to the second PBS at a side opposite to the RR, for reflecting a linearly polarized light comprising a first set of channels and a second set of channels, wherein the first set of channels is reflected without a polarization plane rotation, wherein the second set of channels is reflected with a polarization plate rotation.

8. A device functioning as an optical signal MUX and an optical isolator, the device comprising:
   a first PBS;
   a first set of optical rotators optically coupled to the first PBS at a face of the first PBS that is intersecting a main axis of the MUX, the first set of optical rotators comprising a first NRR and a first RR;
   a second PBS optically coupled to the first set of optical rotators at a side opposite to the first PBS;
   a first reflective NLI optically coupled to the second PBS at a side opposite to the first set of optical rotators for reflecting a linearly polarized light comprising a first set of channels and a second set of channels, wherein the first set of channels is reflected without a polarization plane rotation, wherein the second set of channels is reflected with a polarization plate rotation;
   a second set of optical rotators optically coupled to the second PBS at a face of the second PBS that is not intersecting the main axis, the second set of optical rotators comprising a second NRR and a second RR; and
   a third PBS optically coupled to the second set of optical rotators at a side opposite to the second PBS.

9. A device functioning as a composite optical signal DEMUX, a comb filter, and an optical isolator, comprising:
   a first PBS;
   a first set of optical rotators optically coupled to the first PBS at a face of the first PBS that is intersecting a main axis of the device, the first set of optical rotators comprising a first NRR and a first RR;
   a second PBS optically coupled to the first set of optical rotators at a side opposite to the first PBS;
   a first reflective NLI optically coupled to the second PBS at a side opposite to the first set of optical rotators for reflecting a linearly polarized light comprising a first set of channels and a second set of channels, wherein the first set of channels is reflected without a polarization plane rotation, wherein the second set of channels is reflected with a polarization plate rotation;
   a second set of optical rotators optically coupled to the second PBS at a face of the second PBS that is not intersecting the main axis, the second set of optical rotators comprising a second NRR and a second RR;
   a third PBS optically coupled to the first PBS at a face of the first PBS that is not intersecting the main axis;
   a second reflective NLI optically coupled to the third PBS;
   a fourth PBS optically coupled to the second set of optical rotators at a side opposite to the second PBS; and a third reflective NLI optically coupled to the fourth PBS.

10. A system, comprising:
an optical network, the optical network comprising a composite optical signal; and
an optical device, the optical device comprising:
  a first PBS,
  a set of optical rotators optically coupled to the first PBS at a face intersecting a main axis of the separator, the set of rotators comprising a NRR and a RR,
  a second PBS optically coupled to the set of optical rotators at a side opposite to the first PBS, and
  a NLI optically coupled to the second PBS at a side opposite to the set of optical rotators.

11. A system, comprising:
an optical network, the optical network comprising a plurality of channels; and
a device functioning as a MUX for combining the plurality of channels into a composite optical signal and as an optical isolator, the device comprising:
  a first PBS,
  a first set of optical rotators optically coupled to the first PBS at a face intersecting a main axis of the device, the first set of optical rotators comprising a first NRR and a first RR,
  a second PBS optically coupled to the first set of optical rotators at a side opposite to the first PBS,
  a NLI optically coupled to the second PBS at a side opposite to the first set of optical rotators,
  a second set of optical rotators optically coupled to the second PBS at a face not intersecting the main axis, the second set of optical rotators comprising a second NRR and a second RR, and
  a third PBS optically coupled to the second set of optical rotators at a side opposite to the second PBS.

12. A method for demultiplexing a composite optical signal, the composite optical signal comprising a first channel and a second channel, comprising the steps of:
  (a) transmitting the composite optical signal with a first polarization;
  (b) reflecting the composite optical signal from a non-linear interferometer, wherein the non-linear interferometer rotates a polarization plane of the first channel to a second polarization;
  (c) deflecting the first channel to a first port and transmitting the second channel;
  (d) rotating a polarization plane of the second channel to the second polarization; and
  (e) deflecting the second channel to a second port.

13. A method for multiplexing a plurality of channels, comprising the steps of:
  (a) deflecting a first channel of the plurality of channels with a first polarization;
  (b) rotating a polarization plane of the first channel to a second polarization;
  (c) transmitting a second channel of the plurality of channels with a first polarization;
  (d) deflecting the second channel;
  (e) reflecting the first and second channels from a non-linear interferometer, wherein the non-linear interferometer rotates a polarization plane of the second channel to the second polarization; and
  (f) transmitting the first and second channels to a port.

14. A system, comprising:
an optical network comprising a DEMUX; and
a composite optical signal comprising a first and second channel, the composite optical signal traversing through the DEMUX,
  wherein the composite optical signal with a first polarization is transmitted,
  wherein the composite optical signal is reflected from a non-linear interferometer, wherein the non-linear interferometer rotates a polarization plane of the first channel to a second polarization,
  wherein the first channel is deflected to a first port and the second channel is transmitted,
  wherein a polarization plane of the second channel is rotated to the second polarization, and
  wherein the second channel is deflected to a second port.

15. A system, comprising:
an optical network comprising a MUX; and
a plurality of channels, the plurality of channels traversing through the MUX,
  wherein a first channel of the plurality of channels with a first polarization is deflected,
  wherein a polarization plane of the first channel is rotated to a second polarization,
  wherein a second channel of the plurality of channels with a first polarization is transmitted;
  wherein the second channel is deflected,
  wherein the first and second channels are reflected from a non-linear interferometer, wherein the non-linear interferometer rotates a polarization plane of the second channel to the second polarization, and
  wherein the first and second channels are transmitted to a port.

16. A system for demultiplexing a composite optical signal, the composite optical signal comprising a first channel and a second channel, comprising:
  means for transmitting the composite optical signal with a first polarization;
  means for reflecting the composite optical signal from a non-linear interferometer, wherein the non-linear interferometer rotates a polarization plane of the first channel to a second polarization;
  means for deflecting the first channel to a first port and transmitting the second channel;
  means for rotating a polarization plane of the second channel to the second polarization; and
  means for deflecting the second channel to a second port.

17. A system for multiplexing a plurality of channels, comprising:
  means for deflecting a first channel of the plurality of channels with a first polarization;
  means for rotating a polarization plane of the first channel to a second polarization;
  means for transmitting a second channel of the plurality of channels with a first polarization;
  means for deflecting the second channel;
  means for reflecting the first and second channels from a non-linear interferometer, wherein the non-linear interferometer rotates a polarization plane of the second channel to the second polarization; and
  means for transmitting the first and second channels to a port.

18. A system, comprising:
an optical network, the optical network comprising a composite optical signal; and an optical device, the optical device comprising:
  a first PBS,
  a set of optical rotators optically coupled to the first PBS at a face intersecting a main axis of the separator, the set of rotators comprising a NRR and a RR,
  a second PBS optically coupled to the set of optical rotators at a side opposite to the first PBS, and
  a reflective NLI optically coupled to the second PBS at a side opposite to the set of optical rotators for reflecting a linearly polarized light comprising a first set of channels and a second set of channels, wherein the first set of channels is reflected without a polarization plane rotation, wherein the second set of channels is reflected with a polarization plate rotation.

19. A system, comprising:
an optical network, the optical network comprising a plurality of channels; and
a device functioning as a MUX for combining the plurality of channels into a composite optical signal and as an optical isolator, the device comprising:
  a first PBS,
  a first set of optical rotators optically coupled to the first PBS at a face of the first PBS that is intersecting a main axis of the device, the first set of optical rotators comprising a first NRR and a first RR,
  a second PBS optically coupled to the first set of optical rotators at a side opposite to the first PBS,
  a reflective NLI optically coupled to the second PBS at a side opposite to the first set of optical rotators for reflecting a linearly polarized light comprising a first set of channels and a second set of channels, wherein the first set of channels is reflected without a polarization plane rotation, wherein the second set of channels is reflected with a polarization plate rotation,
  a second set of optical rotators optically coupled to the second PBS at a face of the second PBS that is not intersecting the main axis, the second set of optical rotators comprising a second NRR and a second RR, and
  a third PBS optically coupled to the second set of optical rotators at a side opposite to the second PBS.

* * * * *